United States Patent
Lindsey et al.

(10) Patent No.: US 10,662,284 B2
(45) Date of Patent: May 26, 2020

(54) POLYMER BLENDS

(71) Applicant: Zeus Industrial Products, Inc., Orangeburg, SC (US)

(72) Inventors: James M. Lindsey, Lexington, SC (US); Bruce L. Anneaux, Lexington, SC (US); Elizabeth A. Foley, Columbia, SC (US); Justin A. Marro, Orangeburg, SC (US)

(73) Assignee: Zeus Industrial Products, Inc., Orangeburg, SC (US)

( * ) Notice: Subject to any disclaimer, the term of this patent is extended or adjusted under 35 U.S.C. 154(b) by 136 days.

(21) Appl. No.: 15/903,700

(22) Filed: Feb. 23, 2018

(65) Prior Publication Data

US 2018/0244840 A1    Aug. 30, 2018

Related U.S. Application Data

(60) Provisional application No. 62/463,250, filed on Feb. 24, 2017, provisional application No. 62/558,441, filed on Sep. 14, 2017.

(51) Int. Cl.
*C08L 67/04* (2006.01)
*C08G 63/08* (2006.01)
(Continued)

(52) U.S. Cl.
CPC ............ *C08G 63/08* (2013.01); *C08F 246/00* (2013.01); *C08G 63/42* (2013.01); *C08L 67/04* (2013.01);
(Continued)

(58) Field of Classification Search
CPC .... C08L 67/04; C08L 2205/025; C08L 67/02; C08L 67/00
See application file for complete search history.

(56) References Cited

U.S. PATENT DOCUMENTS 4,091,053 A * 5/1978 Kitchen ............... C08G 81/022
525/98
5,256,736 A * 10/1993 Trepka ................ C08F 297/044
525/250
(Continued)

FOREIGN PATENT DOCUMENTS

EP        135168 A2 *  3/1985

OTHER PUBLICATIONS

PCT International Search Report & Written Opinion dated Jun. 25, 2018, which issued for corresponding PCT Application No. PCT/US2018/051153.

*Primary Examiner* — Mark S Kaucher
(74) *Attorney, Agent, or Firm* — Louis T. Isaf; Womble Bond Dickinson (US) LLP

(57) ABSTRACT

A method for preparing blends of at least two polymer components is described herein. The disclosed method generally involves controlling relative molecular weights and ratios of the two or more polymer components by selecting a first initiator, a second initiator, and a monomer, and subjecting the reactants to conditions suitable to polymerize the monomer based at least in part on the first and second initiators in connection with obtaining the polymeric blend. The second initiator is advantageously selected based on one or more characteristics associated therewith, based on a characteristic of the first initiator. A polymeric blend produced according to such a method is also provided herein.

28 Claims, 14 Drawing Sheets

(51) Int. Cl.
*C08F 246/00* (2006.01)
*C08G 63/42* (2006.01)
C08L 57/00 (2006.01)
G01N 25/48 (2006.01)
G01N 30/00 (2006.01)

(52) U.S. Cl.
CPC ...... *C08F 2500/02* (2013.01); *C08F 2500/03* (2013.01); *C08F 2500/17* (2013.01); *C08F 2800/10* (2013.01); *C08F 2800/20* (2013.01); *C08L 57/00* (2013.01); *C08L 2205/02* (2013.01); *G01N 25/4866* (2013.01); *G01N 2030/486* (2013.01)

(56) References Cited

U.S. PATENT DOCUMENTS

| | | | |
|---|---|---|---|
| 5,545,690 A * | 8/1996 | Trepka | C08F 297/044 525/98 |
| 8,329,205 B2 | 12/2012 | Hadba | |
| 2004/0002850 A1 | 1/2004 | Newman, Jr. et al. | |
| 2004/0006199 A1* | 1/2004 | Newman, Jr. | C08G 63/08 528/354 |
| 2006/0128890 A1* | 6/2006 | Knoll | C08F 297/04 525/88 |
| 2007/0299236 A1 | 12/2007 | Kim et al. | |
| 2008/0134642 A1* | 6/2008 | Brown | C08F 297/04 53/442 |
| 2009/0012202 A1 | 1/2009 | Jacobine et al. | |
| 2010/0071863 A1* | 3/2010 | Sutman | C08F 2/001 162/164.5 |

* cited by examiner

FIGURE 1

Polymer A + Initiator X —Monomer B→ Blend of Polymer A-B + Polymer B

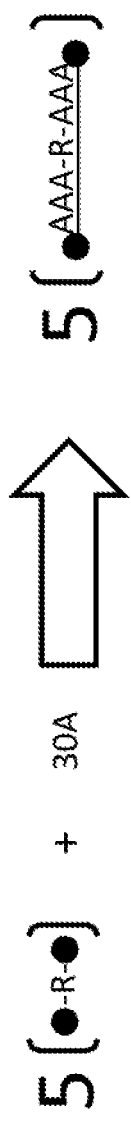
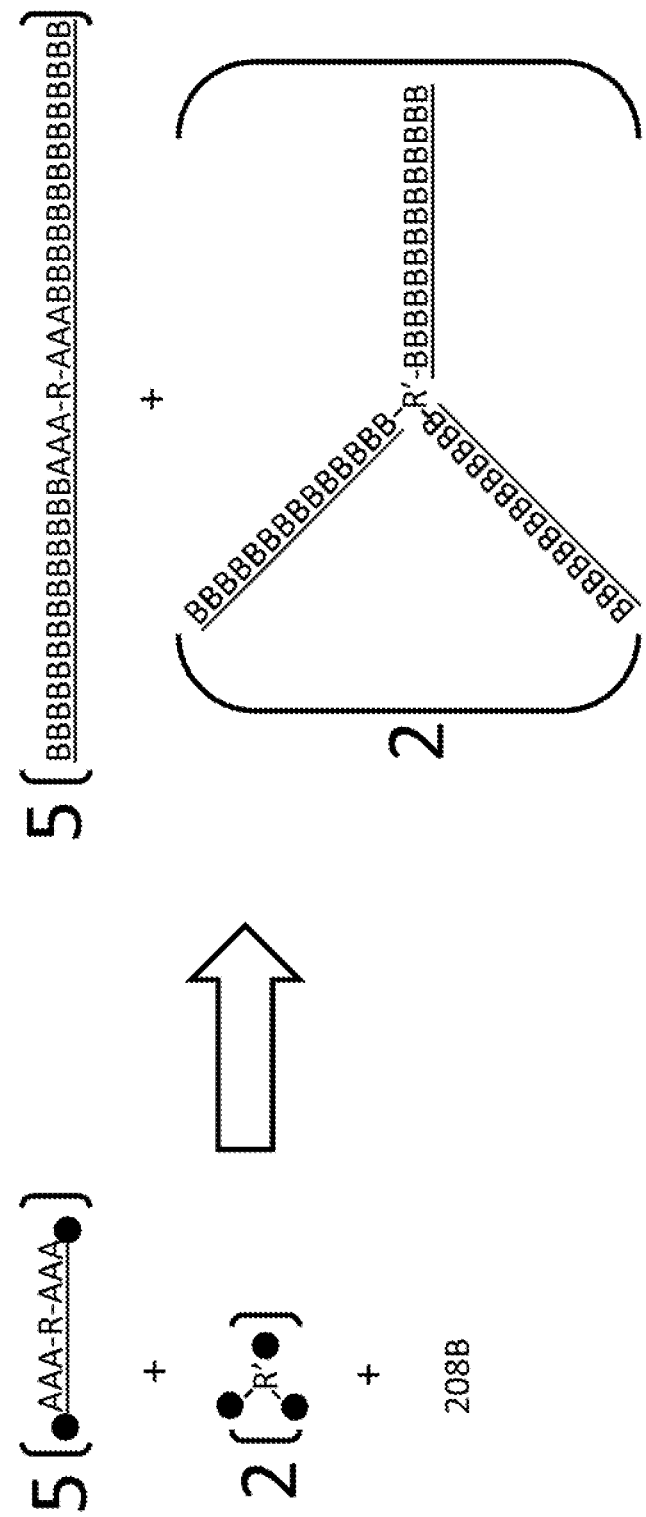
FIGURE 6A
FIGURE 6B

FIGURE 7

| | 1st heat | | | | | Cooling | |
|---|---|---|---|---|---|---|---|
| | $T_m1$ Peak (°C) | $\Delta H_f1$ (J/g) | $T_c1$ Peak (°C) | $\Delta H_f1$ (J/g) | $T_m2$ Peak (°C) | $\Delta H_f2$ (J/g) | $T_c1$ Peak (°C) | $\Delta H_c1$ (J/g) |
| Example 1 | 43.4 ± 1.2 | 1.18 ± 0.66 | 197.7 ± 0.3 | 79.4 ± 2.2 | none | none |
| Example 2 | 45.6 ± 0.3 | 2.93 ± 0.18 | 198.7 ± 1.0 | 83.6 ± 1.5 | none | none |
| Example 3 | 46.7 ± 0.5 | 2.30 ± 0.33 | 193.0 ± 1.3 | 69.6 ± 0.5 | none | none |
| Example 5 | 45.3 ± 0.2 | 1.71 ± 0.47 | 181.6 ± 0.7 | 58.3 ± 0.3 | none | none |
| Example 6 | 46.7 ± 0.2 | 4.66 ± 0.21 | 195.9 ± 1.6 | 77.7 ± 1.4 | 7.7 ± 2.9 | 2.14 ± 0.37 |
| Example 7 | 43.7 ± 0.0 | 0.48 ± 0.1 | 184.8 ± 0.2 | 61.7 ± 3.4 | none | none |

| | 2nd heat | | | | | | |
|---|---|---|---|---|---|---|---|
| | $T_g$ (°C) | $T_c1$ Peak (°C) | $\Delta H_c1$ (J/g) | $T_c2$ Peak (°C) | $\Delta H_c2$ (J/g) | $T_m1$ Peak (°C) | $\Delta H_f1$ (J/g) |
| Example 1 | 56.3 ± 0.7 | 95.7 ± 2.4 | 29.7 ± 0.7 | 150.4 ± 0.6 | 0.95 ± 0.27 | 174.3 ± 0.7 | 26.3 ± 1.3 |
| Example 2 | 56.0 ± 0.6 | 95.2 ± 0.4 | 31.6 ± 0.6 | 157.2 ± 0.6 | 3.60 ± 0.86 | 175.1 ± 0.1 | 36.3 ± 1.0 |
| Example 3 | 60.4 ± 0.4 | 92.4 ± 0.1 | 27.9 ± 1.6 | 151.8 ± 0.3 | 2.93 ± 0.50 | 175.6 ± 0.5 | 28.7 ± 2.4 |
| Example 5 | 56.2 ± 0.3 | 114.1 ± 1.3 | 27.7 ± 3.9 | none | none | 161.1 ± 3.8 | 26.6 ± 5.1 |
| Example 6 | 47.9 ± 0.4 | 91.0 ± 2.5 | 29.8 ± 0.7 | none | none | 172.5 ± 0.4 | 26.5 ± 1.1 |
| Example 7 | 51.3 ± 0.4 | 118.8 ± 0.4 | 24.2 ± 0.6 | none | none | 161.4 ± 0.5 | 23.6 ± 2.3 |

FIGURE 8

| | Diol Initiator : Triol Initator (molar) | Polymer A: Statistically Anticpated Weight% of Polymeric Blend | Polymer A: Statistically Anticpated Mn (Da) | Polymer A: Inherent Viscosity (dL/g) | Polymeric Blend PCL Phase Heat of Fusion (J/g) |
|---|---|---|---|---|---|
| Example 10 | 5:2 | 5 | 18,000 | 0.6 +/- 0.0 | 1.3 +/- 0.2 |
| Example 11 | 5:2 | 10 | 36,000 | 0.9 +/- 0.0 | 3.3 +/- 0.6 |
| Example 2 | 3:2 | 10 | 43,000 | 1.0 +/- 0.0 | 3.5 +/- 0.6 |
| Example 3 | 1:2 | 10 | 77,000 | 1.3 +/- 0.1 | 4.8 +/- 0.3 |

FIGURE 9

| | Diol Initiator : Triol Initator (molar) | PCL weight% of overall composition | Inherent Viscosity (dL/g) | Mn (kDa) | Mw (kDa) | Mp (kDa) | Poly-dispersity Index |
|---|---|---|---|---|---|---|---|
| Example 1 | 5 : 2 | 10 | 3.4 +/- 0.1 | not tested | not tested | not tested | not tested |
| Example 2 | 3 : 2 | 10 | 3.2 +/- 0.1 | 94 +/- 5 | 272 +/- 7 | 178 +/- 14 | 2.9 +/- 0.1 |
| Example 3 | 1 : 2 | 10 | 2.8 +/- 0.2 | 92 +/- 5 | 239 +/- 14 | 165 +/- 11 | 2.6 +/- 0.1 |
| Example 5 | 5 : 2 | 10 | 3.3 +/- 0.1 | not tested | not tested | not tested | not tested |
| Example 6 | 5 : 2 | 15 | 3.2 +/- 0.1 | not tested | not tested | not tested | not tested |
| Example 7 | 5 : 2 | 10 | 3.3 +/- 0.1 | not tested | not tested | not tested | not tested |
| Example 10 | 5 : 2 | 5 | 3.4 +/- 0.2 | 112 +/- 6 | 307 +/- 3 | 206 +/- 21 | 2.8 +/- 0.1 |
| Example 11 | 5 : 2 | 10 | 3.3 +/- 0.0 | not tested | not tested | not tested | not tested |
| Example 12 | 1 : 0 | 15 | 3.3 +/- 0.1 | 119 +/- 6 | 306 +/- 14 | 216 +/- 11 | 2.6 +/- 0.1 |
| Example 13 | 0 : 1 | 0 | 3.5 +/- 0.0 | 149 +/- 7 | 335 +/- 8 | 275 +/- 15 | 2.3 +/- 0.1 |
| Example 14 | 5 : 2 | 10 | 2.3 +/- 0.2 | 100 +/- 2 | 244 +/- 14 | 159 +/- 21 | 2.3 +/- 0.1 |

POLYMER BLENDS

CROSS-REFERENCE TO RELATED APPLICATIONS

The present application claims priority to U.S. Provisional Application Nos. 62/463,250, filed Feb. 24, 2017, and 62/558,441, filed Sep. 14, 2017. The disclosures of both of these applications are incorporated herein by reference in their entireties.

FIELD OF THE INVENTION

The present application is directed to methods for preparing blends of two or more polymers and to polymeric blends provided thereby.

BACKGROUND OF THE INVENTION

A broad range of natural and synthetic polymers with widely varying chemical and physical properties are known. For some applications, a combination of physical and/or chemical properties exhibited by different types of polymers may be desirable. Such combinations may provide such properties as suitable flexibility, elasticity, strength, impact resistance, toughness, thermal stability, degradability/bioabsorbability, or a combination of two or more of the foregoing. To achieve such combinations of properties, there are a number of approaches including, but not limited to, forming copolymers (e.g., by combining multiple monomer types or by grafting one type of polymer to another), and combining two or more types of polymers to create a blend. In some applications, both strategies are employed (e.g., a copolymer is prepared and blended with another polymer).

Blending (or compounding) is a relatively common approach for commercial production of various types of polymer-containing products, including, e.g., medical/surgical devices such as stents, screws, pins, staples, and the like. Blends are prepared by providing the two or more polymers independently and mixing the two or more polymers. See White and Bumm, Polymer Blend Compounding and Processing, in Encyclopedia of Polymer Blends: Vol. 2: Processing, 1$^{st}$ Ed. (2011). Blending can be done in solution (by combining the two or more polymers in a solvent and then removing the solvent) or, more commonly, in the absence of solvent (by combining the polymers at elevated temperature, e.g., above the glass transition temperature of the polymers so that they are soft and can be mixed, and then cooling the resulting mixture).

However, such blending techniques require further processing of prepared polymers, which increases production costs and adds extra levels of complexity, including the risk of excessive polymer degradation. With specific regard to blending in solvents, solvent and non-solvent affinities between species can, in some cases, result in undesirable, thermodynamically driven separation of the polymer species upon solvent removal. Furthermore, with blending in solvents, the solvent must be removed to provide the solid polymer blend, which can, in some cases result in degradation of the polymer due to the application of heat. With specific regard to blending in melts, it may be difficult in some applications to obtain substantially homogenous mixing of the two or more polymers, even when polymers are largely miscible with each other. Accordingly, it would be beneficial to provide additional processes for providing polymer blends.

SUMMARY OF THE INVENTION

The present invention relates to methods for providing blends of polymers and to such blends and products produced therefrom. In particular, the invention relates to blends of two or more polymers prepared in-situ (as compared to polymers independently prepared and subsequently mechanically mixed to provide a blend).

In one aspect, the present invention provides a method for obtaining a polymer blend comprising at least two polymer components, comprising: controlling relative molecular weights of the at least two polymer components and one or more ratios of the at least two polymer components by selecting a plurality of reactants, the reactants comprising: a first initiator; a second initiator, wherein a first value associated with the second initiator is selected based at least in part on a first value associated with the first initiator; and a first monomer; and polymerizing the first monomer based at least in part on the first initiator and the second initiator in connection with obtaining the polymer blend. In some embodiments, the one or more ratios of the at least two polymer components are based at least in part on one or both of a weight ratio and a molar ratio.

In some embodiments, one or more of: (i) a composition of one or more of the at least two polymer components, (ii) a molecular weight of one or more of the at least two polymer components, (iii) a weight of at least one of the at least two polymer components relative to a weight of at least one other of the at least two polymer components, and (iv) a molecular weight of at least one of the at least two polymer components relative to a molecular weight of at least one other of the at least two polymer components, is controlled.

In some embodiments, the first value associated with the second initiator is an amount of the second initiator, and the first value associated with the first initiator is an amount of the first initiator. The amount of the first initiator and the amount of the second initiator may correspond, e.g., to a mass or a number of moles. In some embodiments, at least one of the first initiator and second initiator comprises at least one reactive site capable of functioning as an initiator for polymerization.

In some embodiments, the first value associated with the second initiator is a total number of reactive sites of the second initiator, and the first value associated with the first initiator is a total number of reactive sites of the first initiator. In certain embodiments, the total number of reactive sites of the second initiator is greater than the total number of reactive sites of the first initiator. In other embodiments, the total number of reactive sites of the first initiator is greater than the total number of reactive sites of the second initiator.

In some embodiments, at least a subset of the at least one reactive site is a hydroxyl group. For example, in certain embodiments, at least one of the first initiator and second initiator comprises an alcohol, diol, triol, tetraol, or pentaol. In some embodiments, at least one of the first initiator and second initiator comprises 1-decanol, 1-dodecanol, lactic acid, water, ethylene glycol, poly(ethylene glycol), 1,3-propanediol, 1,6-hexanediol, methane triol, 1,2,3-propanetriol, 2-(hydroxymethyl)propane-1,3diol, 2-ethyl-2-(hydroxymethyl)propane-1,3-diol, tris(2-hydroxyethyl)amine), methanetetraol or 2,2-bis(hydroxymethyl)propane-1,3-diol).

At least one of the first initiator and the second initiator, in some embodiments, is a macroinitiator. For example, in some embodiments, at least one of the first initiator and the second initiator is a macroinitiator that is produced based at least in part by polymerizing a second monomer using at least a third initiator. In particular such embodiments, two or more of the first initiator, second initiator and third initiator are the same. In some embodiments, the first monomer is the same as the second monomer. Exemplary macroinitiators include, but are not limited to, those comprising a polylactide, a polycaprolactone, a polyglycolide; a poly(dioxanone); a poly trimethylene carbonate; a poly(hydroxybutyrate); a poly(anhydrides); an aliphatic polycarbonate; a poly(orthoesters); a poly(amino acid); a poly(ethylene oxide); a poly (ethylene glycol); a polyphosphazene, a polyvinyl alcohol, or a copolymer thereof. In some embodiments, the macroinitiator comprises at least one reactive site capable of functioning as an initiator for polymerization. In certain embodiments, the macroinitiator has a polydispersity index of less than about 2.

In some embodiments, at least one of the first and second initiator comprises at least one reactive site that is not an initiation site, and at least a subset of the at least one reactive site can be converted into an initiation site. For example, in certain embodiments, one or more of the reactive sites that is not an initiation site can be converted into an initiation site in the event of a chemical reaction. The second initiator, in some embodiments, is not water. The first initiator, in some embodiments, is not water. In some embodiments, the selecting the plurality of reactants comprises combining the first initiator and the second initiator according to a predetermined order.

In some embodiments, an amount of the first monomer is selected based at least in part on one or more of: (i) the first value associated with the first initiator, (ii) a second value associated with the first initiator, (iii) a third value associated with the first initiator, (iv) a fourth value associated with the first initiator, (v) the first value associated with the second initiator, (vi) a second value associated with the second initiator, (vii) a third value associated with the second initiator, (viii) a fourth value associated with the second initiator, and (ix) a fifth value based at least in part on (a) the first value associated with the first initiator and the first value associated with the second initiator or (b) the second value associated with the first initiator and the second value associated with the second initiator or (c) the third value associated with the first initiator and the third value associated with the second initiator or (d) the fourth value associated with the first initiator and the fourth value associated with the second initiator.

In some embodiments, an amount of the first monomer is selected based at least in part on one or more of: (i) the first value associated with the first initiator, (ii) a second value associated with the first initiator, (iii) a third value associated with the first initiator, (iv) a fourth value associated with the first initiator, (v) the first value associated with the second initiator, (vi) a second value associated with the second initiator, (vii) a third value associated with the second initiator, (viii) a fourth value associated with the second initiator, and (ix) a fifth value based at least in part on (a) the first value associated with the first initiator and the first value associated with the second initiator or (b) the second value associated with the first initiator and the second value associated with the second initiator or (c) the third value associated with the first initiator and the third value associated with the second initiator or (d) the fourth value associated with the first initiator and the fourth value associated with the second initiator. In some such embodiments, the first value associated with the first initiator is an amount of the first initiator, the first value associated with the second initiator is an amount of the second initiator, the second value associated with the first initiator is a total number of reactive sites of the first initiator, the second value associated with the second initiator is a total number of reactive sites of the second initiator, the third value associated with the first initiator is a number of reactive sites per molecule of the first initiator, the third first value associated with the second initiator is a number of reactive sites per molecule of the second initiator, the fourth value associated with the first initiator is a property of the first initiator, and the fourth value associated with the second initiator is a property of the second initiator.

In some embodiments, the first monomer comprises a lactide, glycolide, caprolactone, trimethylene carbonate, or para dioxanone monomer. The disclosed method, in some embodiments, further comprises heating the plurality of reactants to melt or soften the plurality of reactants. In certain such embodiments, the heating of the plurality of reactants is done in the absence of added solvent. In some embodiments, the plurality of reactants comprises a polymerization catalyst.

In another aspect, the present disclosure provides a method for obtaining a polymer blend comprising at least two polymer components, comprising: controlling relative molecular weights of the at least two polymer components and one or more ratios of the at least two polymer components by selecting a plurality of reactants, the plurality of reactants comprising: a first initiator; a second initiator, wherein a first value associated with the second initiator and a second value associated with the second initiator are selected based at least in part on a first value associated with the first initiator and a second value associated with the first initiator; and a first monomer; and polymerizing the first monomer based at least in part on the first initiator and the second initiator in connection with obtaining the polymer blend. In certain such embodiments, one or more of: (i) a composition of one or more of the at least two polymer components, (ii) a molecular weight of one or more of the at least two polymer components, (iii) a weight of at least one of the at least two polymer components relative to a weight of at least one other of the at least two polymer components, and (iv) a molecular weight of at least one of the at least two polymer components relative to a molecular weight of at least one other of the at least two polymer components, is controlled. In certain such embodiments, the first value associated with the second initiator is a total number of reactive sites of the second initiator, the second value associated with the second initiator is a number of reactive sites per molecule of the second initiator, the first value associated with the first initiator is a total number of reactive sites of the first initiator, and the second value associated with the first initiator is a number of reactive sites per molecule of the first initiator.

In certain embodiments, an amount of the first monomer is selected based at least in part on one or more of: (i) the first value associated with the first initiator, (ii) the second value associated with the first initiator, (iii) a third value associated with the first initiator, (iv) a fourth value associated with the first initiator, (v) the first value associated with the second initiator, (vi) the second value associated with the second initiator, (vii) a third value associated with the second initiator, (viii) a fourth value associated with the second initiator, and (ix) a fifth value based at least in part on (a) the first value associated with the first initiator and the first value associated with the second initiator or (b) the second value associated with the first initiator and the second value associated with the second initiator or (c) the third value associated with the first initiator and the third value associated with the second initiator or (d) the fourth value associated with the first initiator and the fourth value associated with the second initiator. In certain embodiments, the first value associated with the first initiator is an amount of the first initiator, the first value associated with the second initiator is an amount of the second initiator, the second value associated with the first initiator is a total number of reactive sites of the first initiator, the second value associated with the second initiator is a total number of reactive sites of the second initiator, the third value associated with the first initiator is a number of reactive sites per molecule of the first initiator, the third first value associated with the second initiator a number of reactive sites per molecule of the second initiator, the fourth value associated with the first initiator is a property of the first initiator, and the fourth value associated with the second initiator is a property of the second initiator.

The property of the first initiator, in certain embodiments, corresponds to one or more of (i) a chemical property of the first initiator, and (ii) a mechanical property of the first initiator. The property of the second initiator, in certain embodiments, corresponds to one or more of (i) a chemical property of the second initiator, and (ii) a mechanical property of the second initiator. The fifth value, in some embodiments, is obtained at least in part by addition of the amount of first initiator and the amount of second initiator, or by addition of the total number of reactive sites of the first initiator and the total number of reactive sites of the second initiator, or by addition of the number of reactive sites per molecule of the first initiator and the total number of reactive sites per molecule of the second initiator.

In further aspects, the present disclosure provides a method, comprising: obtaining at least one of a predefined relative molecular weight and a predefined ratio; and polymerizing a plurality of reactants in connection with obtaining a polymer blend comprising at least two polymer components, wherein a relative molecular weight of the at least two polymer components corresponds to the predefined relative molecular weight, or wherein a ratio of the at least two polymer components with respect to each other corresponds to the predefined ratio. In another aspect, the disclosure provides a method for obtaining a polymer blend comprising at least two polymer components comprising: selecting a plurality of reactants, the plurality of reactants comprising: a first initiator; a second initiator; and a monomer; and polymerizing the monomer based at least in part on the first initiator and the second initiator in connection with obtaining the polymer blend.

In another aspect, the present disclosure provides a polymer blend prepared according to any of the methods disclosed herein. The disclosure further provides various products, including, but not limited to, medical devices and products comprising a polymer blend as disclosed herein.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 1 provides a schematic overview of the synthesis method disclosed herein;

FIGS. 6A, 6B, 6C, 6D, 6E, and 6F are exemplary representations of further embodiments of the method disclosed herein;

FIG. 7 provides differential scanning calorimetry (DSC) data for certain blends prepared according to the specific methods of the Examples;

FIG. 8 provides Inherent Viscosity (IV) and DSC data for certain polymeric initiators and polymeric blends prepared according to the specific methods of the Examples; and FIG. 9 provides Inherent Viscosity (IV) and Gel Permeation Chromatography (GPC) data for certain polymeric blends and polymeric blend component analogues prepared according to the specific methods of the Examples.

DETAILED DESCRIPTION OF THE INVENTION

Figure 2:
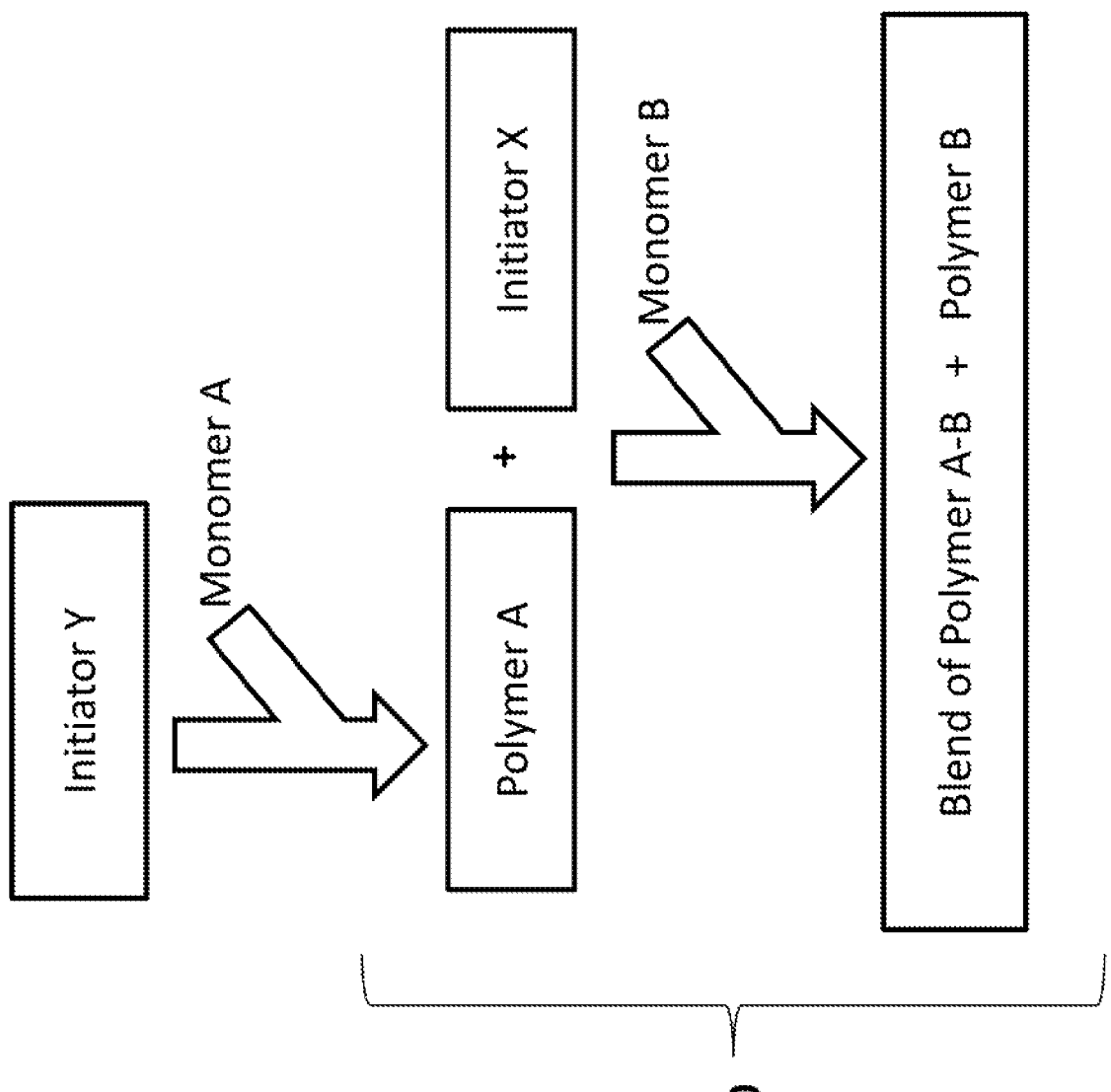
FIG. 2 is a schematic representation of additional method steps associated with certain embodiments of the synthesis method of FIG. 1.
Figure 3A:
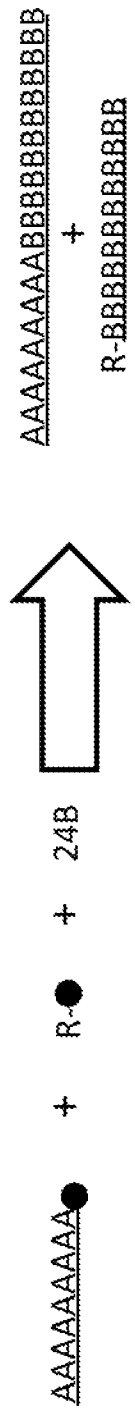
FIGS. 3A, 3B, 3C, and 3D are exemplary representations of four embodiments of the synthesis method of FIG. 1.
Figure 3B:
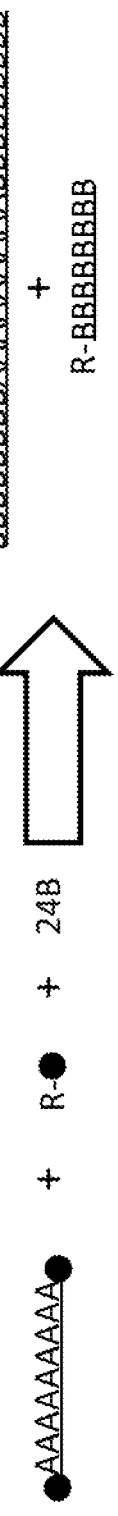
Figure 3C:
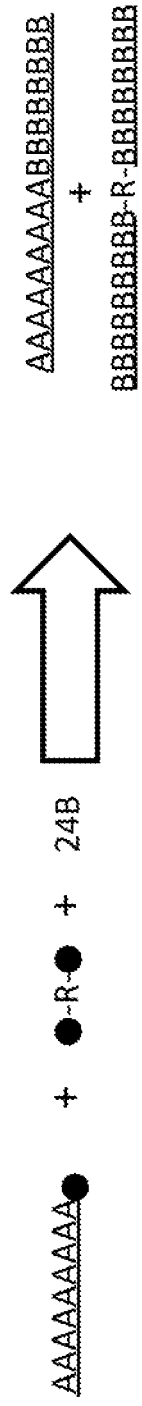
Figure 3D:
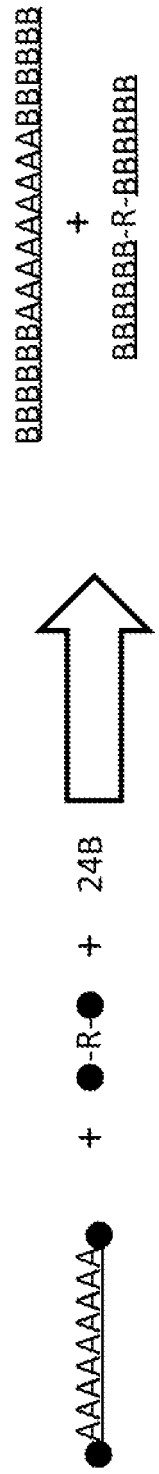

The present invention will now be described more fully hereinafter with reference to the accompanying figures, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, "analogue" refers to a polymer that is equivalent to another polymer in the theoretically ideal sense. In some cases, the analogue is a polymer that is statistically anticipated to be equivalent to another polymer. For example, two polymers that are prepared with statistically equivalent amounts of the same initiator or initiators, statistically equivalent amounts of same monomer or monomers, appropriate amounts of the same catalyst or catalysts and the appropriate reaction conditions are anticipated to yield statistically equivalent polymers.

The disclosure relates generally to methods for preparing polymer mixtures and, in particular, to methods for preparing polymer mixtures comprising at least one copolymer. An exemplary, schematic overview of the method 10 outlined herein is provided in FIG. 1, with specific exemplary methods represented in other figures provided herewith. The disclosed methods generally involve a polymerization reaction wherein two or more moieties serve as initiators, for example, Polymer A and Initiator X as illustrated in FIG. 1. By polymerizing a monomer from two or more initiators, blends can be prepared during preparation of at least a portion of the constituent polymers, avoiding the need for post-synthesis blending methods, as detailed further herein below. Such methods can allow for some degree of control of the relative molecular weights and the ratios of the polymers produced from initiators present in the reaction mixture (e.g., from Polymer A and from Initiator X). Such methods can uniquely lead to, e.g., blends comprising two or more polymers wherein each polymer has at least one segment/block that is theoretically identical in terms, e.g., of composition and molecular weight.

The methods disclosed herein generally involve particular selections of reactants based at least in part on one or more characteristics or values associated therewith. The characteristics or values of the reactants can be, e.g., amounts thereof (such as number of moles or mass thereof), number of reactive sites thereon, number of initiation sites thereon, or a property thereof (e.g., a chemical or mechanical property). The application uses the terms "first," "second," and in some embodiments, further (e.g., "third," "fourth," "fifth," etc.) values corresponding to various features (e.g., initiators, values, monomers, etc.) and it is noted that these terms are not to be construed as requiring any particular order; rather, these terms are used for ease of reference to different components/values.

The disclosed methods involve at least a first initiator and a second initiator, as will be described in further detail herein. An "initiator" as intended according to the present disclosure, is a molecule that comprises at least one reactive site that is an initiation site or can be converted to an initiation site in connection with various embodiments. An initiation site is understood to be a part of a molecule that is capable of serving as a starting point for polymerization (i.e., for initiating polymerization). Suitable functional groups that can serve as initiation sites vary, e.g., based upon the monomer(s) to be employed in the polymerization reaction and the anticipated method of polymerization. The disclosed methods involve polymerization from one or more initiation sites on the at least first initiator and second initiator, i.e., reaction of monomer molecules in a chemical reaction to form polymer chains or three-dimensional networks. It is understood that, during polymerization, as monomer molecules react with initiation sites on the initiators, those initiation sites are no longer "active," i.e., capable of serving as a starting point for polymerization. Rather, one or more reactive sites or initiation sites present on the monomer molecule now associated with the initiators serves as the starting point for further polymerization. A reactive site is a particular location within a chemical compound that is the likely site of a reaction in which the chemical compound is involved. A reactive center (also called a propagating center) is a particular location (usually an atom) within a chemical compound that is the likely center of a reaction in which the chemical compound is involved. In chain-growth polymer chemistry, this is also the point of propagation for a growing chain. The reactive center is commonly radical, anionic, or cationic in nature, but can also take other forms. In one specific embodiment, a reactive site can comprise a benzoyloxyl radical. The method 10 of FIG. 1 employs, as starting materials, a polymer (referred to herein and in FIG. 1 as "Polymer A"), an initiator ("Initiator X"), and a "Monomer B". The composition and architecture of Polymer A are not particularly limited and Polymer A can generally be any polymer with at least one moiety thereon capable of further reaction, e.g., an end group/initiation site capable of functioning as an initiator for the polymerization of Monomer B. One exemplary such moiety is a hydroxide (OH) group (which can serve as an initiator for the polymerization of, e.g., lactide and caprolactone monomers). Polymer A can, for example, have from one to ten such moieties thereon capable of further reaction (i.e., initiation sites). Polymer A can have various structures and may be, e.g., a linear polymer chain, a branched polymer chain (including star polymers, comb polymers, brush polymers, dendrimers, dendronized polymers, ladders, etc.), a cross-linked chain, or a network polymer.

In certain embodiments, as shown in FIG. 2, the method further comprises preparing Polymer A (by reaction of Monomer A and Initiator Y). In various embodiments, Polymer A can be provided independently or can be directly produced as part of the overall method. In some specific embodiments, a "one-pot" synthesis is done based on the embodiment shown in FIG. 2, wherein Initiator Y is used to produce Polymer A and Initiator X and Monomer B are directly added to result in the polymer blend.

Exemplary "Polymer A" polymers include, but are not limited to, poly(lactides), including poly(L-lactide) (PLLA), poly(D-lactide) (PDLA), poly (D,L-lactide) (PDLLA), and poly(D-lactide/L-lactide), produced from D-lactide and L-lactide (PLDLA); polyglycolides (PGA); poly(glycolides), poly(caprolactones) (PCL), e.g., poly ε-caprolactone; poly(hydroxybutyrates); poly(anhydrides); aliphatic polycarbonates, e.g., polytrimethylenecarbonate (PTMC); poly(orthoesters); poly(amino acids); poly(ethylene oxide); poly(ethylene glycol); polyphosphazenes, and polyvinyl alcohols. Polymer A may, as provided, comprise one or more suitable end groups for further reaction (e.g., initiating the polymerization of one or more monomers, e.g., Monomer B) or can be suitably modified by known synthetic techniques to provide the desired end group/initiation site for polymerization of one or more monomers. As such, the composition of Polymer A can vary significantly, so long as it has suitable end group(s)/initiation site(s) or can be modified appropriately during or after synthesis to serve as a macroinitiator, e.g., a polymer that can initiate further polymerization (typically with monomers of another type, i.e., not those monomers from which Polymer A is constructed, although not limited thereto).

Polymer A can be homopolymeric or copolymeric, comprising two or more of the types of polymers described herein, in block, random, or alternating form. "Copolymer" as used herein is not intended to be limited to two types of polymers and can include any number of different monomer units (e.g., terpolymers, tetrapolymers, and the like). Polymer A, for example, may comprise a copolymer, including, but not limited to, poly(lactide-glycolic acid) (PLGA) or PLC (poly-L-lactide-co-caprolactone).

The disclosed method is not understood to be particularly limited in terms of the molecular weight of Polymer A. As such, polymers of varying molecular weights and varying polydispersity indices (PDIs) can be used in accordance with the methods provided herein. However, to achieve comparable polymer domain sizes in different blend components, as will be described more thoroughly subsequently herein, and/or to achieve a more homogeneous blend, it may be advantageous in some embodiments for there to be a relatively low distribution of chain lengths within the starting material, e.g., for Polymer A to have a relatively low PDI, e.g., less than about 2 or less than about 1.5.

The initiator component (Initiator X) can vary widely. The initiator can be polymeric (e.g., a macroinitiator) or non-polymeric and typically has at least one end group/initiation site capable of reaction (with Monomer B). The composition of the at least one initiation site capable of reaction depends on Monomer B and its polymerization mechanism. For example, where Monomer B is a monomer such as lactide or caprolactone, the at least one initiation site may be an alcohol (OH) group. The number of such initiation sites capable of reaction can vary, e.g., from one to about ten. For example, the initiator can be a monofunctional alcohol initiator (i.e., having one initiation site) such as an alkyl alcohol (e.g., 1-decanol, 1-dodecanol), an alkyl hydroxyl acid (e.g., lactic acid), or water, a difunctional alcohol initiator/diol (i.e., having two initiation sites) (e.g., ethylene glycol, poly(ethylene glycol), 1,3-propanediol, or 1,6-hexanediol), a trifunctional alcohol initiator/triol (i.e., having three initiation sites) (e.g., methane triol, 1,2,3-propanetriol, 2-(hydroxymethyl)propane-1,3-diol, 2-ethyl-2-(hydroxymethyl)propane-1,3-diol, or tris(2-hydroxyethyl)amine), a tetrafunctional alcohol initiator/tetraol (i.e., having four initiation sites) (e.g., methanetetraol or 2,2-bis(hydroxymethyl)propane-1,3-diol), etc. In some embodiments, the initiator comprises an alcohol other than water. Advantageously, in preferred embodiments, Initiator X is specifically selected and included within the reaction mixture and is not already present (e.g., as an impurity in Polymer A or the optional catalyst). In some embodiments, the initiator is a discrete compound (e.g., small molecule or polymer) and in other embodiments, the initiator is associated with another component, e.g., in the form of a particulate initiator with one or more initiation sites on its surface (including, but not limited to, PGA particles and functionalized fillers).

It is noted that portions of the present application (including the Examples) focus on polymerizations that proceed from such alcohol end groups/initiation sites (e.g., employing diol initiators, triol initiators, and the like). However, it is expressly noted that the application is not limited thereto and is widely applicable to use of other types of initiator/reactive sites suitable for other types of polymerization reactions. For example, initiators comprising an azo group, peroxide, or vinyl group may be employed for free radical polymerizations. In one embodiment, co-initiators benzoyl peroxide and N,N-dimethyl-para-toluidine can be employed as "Initiator X" and/or "Initiator Y." In certain embodiments, a photoinitiator can be used, including, but not limited to, azobisisobutyronitrile, t-butyl peroxide, benzoyl peroxide, 1-hydrocycyclohexyl phenyl ketone, or andazoisopropane and, in such embodiments, irradiation instead of the N,N-dimethyl-para-toluidine can be employed. It is noted that where such methods are used to produce Polymer A, the "end group" of Polymer A may not necessarily be a true "initiation site" or "reactive site" from which further propagation can occur and, in some embodiments, further reaction (e.g., the grafting of a vinyl group or incorporation of a vinyl group into the polymer) may be required to obtain a functional group capable of serving as an initiation site. Additionally, a reactive site that is not an initiator, (e.g. a carboxylic acid) can be converted into an initiation site (e.g. an alcohol) via further reaction (e.g., reduction reaction).

Polymer A and Initiator X are combined with one or more monomers. In the embodiment shown in FIG. 1, Polymer A and Initiator X are combined with Monomer B. Monomer B can comprise any monomers capable of polymerization via initiation from one or more end groups/initiation sites on Polymer A and one or more initiation sites on the Initiator. In this manner, both Polymer A and Initiator X are capable of serving as initiators for the polymerization of Monomer B, forming a Polymer A-B copolymer and an Initiator X-containing polymer (referred to generally herein as "Polymer B"), in the form of either an Initiator-terminated Polymer B, X-Polymer B (where the Initiator is monofunctional), or an Initiator-containing Polymer B (where the Initiator is multifunctional, e.g., difunctional, (Polymer B-X-Polymer B), trifunctional, tetrafunctional, etc.). In certain embodiments, Monomer B is a monomer capable of living polymerization. Living polymerization is characterized by a substantially constant rate of chain growth (due to minimal chain transfer and chain termination reactions) and, accordingly, is characterized by the synthesis of polymer chains whose lengths are very similar (e.g., they have a low polydispersity index). Living polymerizations are known which proceed via anionic mechanisms, cationic mechanisms, ring opening mechanisms, free radical mechanisms, and chain growth polycondensation mechanisms, and all such mechanisms can be useful in certain embodiments of the methods outlined herein.

The polymerization of Monomer B can be done under varying conditions, depending at least in part on the particular composition of Monomer B. For example, the polymerization can be done in bulk material (e.g., in the presence of largely only the starting materials), typically at elevated temperatures (wherein the material is largely or wholly melted). The polymerization can alternatively be conducted in one or more solvents suitable to solubilize and/or disperse the reaction components. Further, the reaction can be done at varying temperatures and can be done in the presence or absence of catalyst. In some embodiments, the addition of a catalyst can be beneficial to promote the polymerization of Monomer B from the initiation sites on Polymer A and Initiator X. The specific catalyst and the amount thereof employed can vary, e.g., based on known polymerization techniques for a given monomer. For example, metal complexes such as complexes of Al, Mg, Zn, Ca, Sn, Fe, Y, Sm, Lu, Ti and Zr have been widely used to catalyze the ring opening polymerization of various lactone monomers (e.g., lactide and caprolactone). One exemplary catalyst for such ring opening polymerizations is tin(II)octoate (also referred to as tin(II)-2-ethylhexanoate, stannous bis(2-ethylhexanoate), or $Sn(Oct)_2$). Other catalysts, including organic catalysts (e.g., dimethylaminopyridine, DMAP) and cationic catalysts are known for ring opening of lactone monomers as well and can be used in the disclosed methods.

The time for which the polymerization is conducted can vary, but is typically that amount of time needed to polymerize at least some of Monomer B from the initiation sites on Polymer A and Initiator X. In some embodiments, the amount of time required is determined based on monitoring percent conversion of Monomer B to polymer. In some embodiments, the amount of time is that time sufficient to provide at least about 50% conversion of Monomer B, at least about 60% conversion of Monomer B, at least about 70% conversion of Monomer B, at least about 80% conversion of Monomer B, at least about 90% conversion of Monomer B, at least about 95% conversion of Monomer B, at least about 98% conversion of Monomer B, or at least about 98% conversion of Monomer B. In some embodiments, percent conversion can be monitored by removing samples from the reaction mixture and analyzing such samples, e.g., by gel permeation chromatography (GPC) or spectroscopy (e.g., $^1H$ nuclear magnetic resonance (NMR) spectroscopy), from which a comparison of monomer and polymer content can be made to determine percent conversion.

One notable feature of living polymerization is that each end group/initiation site on Polymer A and on the Initiator is theoretically responsible for one polymer chain and, given the statistically controlled activity within the reaction, all such polymer chains ideally have similar lengths and similar compositions. As such, the method disclosed herein may be uniquely capable of providing blends wherein polymer "blocks" or "arms" within one blended component have molecular weights and compositions that are largely comparable to polymer "blocks" or "arms" of a second component (or to the polymer chain of a homopolymeric component, e.g., an Initiator-terminated polymer chain). This feature can provide certain benefits in the context of the blend provided following reaction to produce Polymer B. The theoretically identically matched composition and molecular weight of the segments/blocks/arms can, in some embodiments, aid in the compatibility (e.g., hydrogen bonding, co-crystallization) of all components. Such compatibility in certain embodiments can allow for better phase mixing than that exhibited by a traditional physical melt-blend, and/or than that exhibited by a solution-blend of similar polymers.

Various parameters can be adjusted within the disclosed process to achieve the desired combination of properties. A desired combination of properties can include chemical and/or physical properties, e.g., including, but not limited to, toughness, elasticity, flexibility, rigidity, strength, resilience, impact resistance, elongation properties, fracture toughness, strength, thermal stability, melting point range or glass transition temperature range, optical clarity or opacity, degradability, biodegradability, absorbability, bioabsorbability, resorbability, and bioresorbability. Within the context of the blend afforded by the unique method disclosed herein, the specific properties exhibited by the blend can vary and can, at least to some extent, be tuned, e.g., by selecting the reaction materials (e.g., Polymer A, Initiator, and/or Monomer B) based on, for example, the ratio of reactants, number of active sites per reactant, polymeric backbone structure (e.g. linear, tri-axial, tetra-axial, branched, cross-linked, etc.), and monomeric/repeat unit structure (e.g. random, alternating, segmented, blocky, etc.).

Various attributes of the final blend can be modified by selecting the number of end groups/initiation sites on Polymer A and/or by selecting the number of initiation sites on the Initiator. Certain examples based on the general method outlined in FIG. 1 are illustrated in FIGS. 3A-3D, wherein • refers to an end group/reactive initiation site as referenced herein above. As shown in the figures, by selecting Polymer A and the Initiator with different numbers of end groups/initiation sites, various attributes of the final blend can be modified, including, but not limited to: 1) the relative amounts of Polymer A-B and Polymer B, 2) the relative molecular weights of Polymer A-B and Polymer B, 3) the relative lengths of the B segments of Polymer A-B and Polymer B, 4) the monomeric/repeat unit structure (e.g. di-block or tri-block) of Polymer A-B, and 5) the number of end groups/initiation sites on Polymer A-B and Polymer B.

For example, assuming comparable ratios of Polymer A, Initiator, and Monomer B in FIGS. 3A to 3D, different amounts of Polymer A-B and Polymer B, different molecular weights of Polymer A-B and Polymer B, different lengths of Polymer B segments, different numbers of blocks in Polymer A-B (as shown, either a di-block or tri-block Polymer A-B structure), and different numbers of end groups/initiation sites (either monofunctional/monofunctional, difunctional/monofunctional, monofunctional/difunctional, or difunctional/difunctional functionalities for Polymer A-B and Polymer B respectively), are produced by selecting combinations of a monofunctional or difunctional Polymer A and a monofunctional or difunctional Initiator. This degree of control can allow one of skill in the art to select such functionalities to provide for the desired physical properties of the end product via the control of various parameters, including, but not limited to, 1) the relative contribution of the polymer components to the average molecular weight and melt viscosity of the final blend, 2) the degree of crystallinity and crystalline morphology of the polymer segments, the polymer components, and the final blend, 3) the thermal transitions (e.g., glass transitions) of the polymer segments, the polymer components, and the final blend, 4) the hydrophilicity/hydrophobicity of the polymer segments, the polymer components, and the final blend, and 5) the level and rate of bioabsorbability of the polymer segments, the polymer components, and the final blend.

Figure 4:
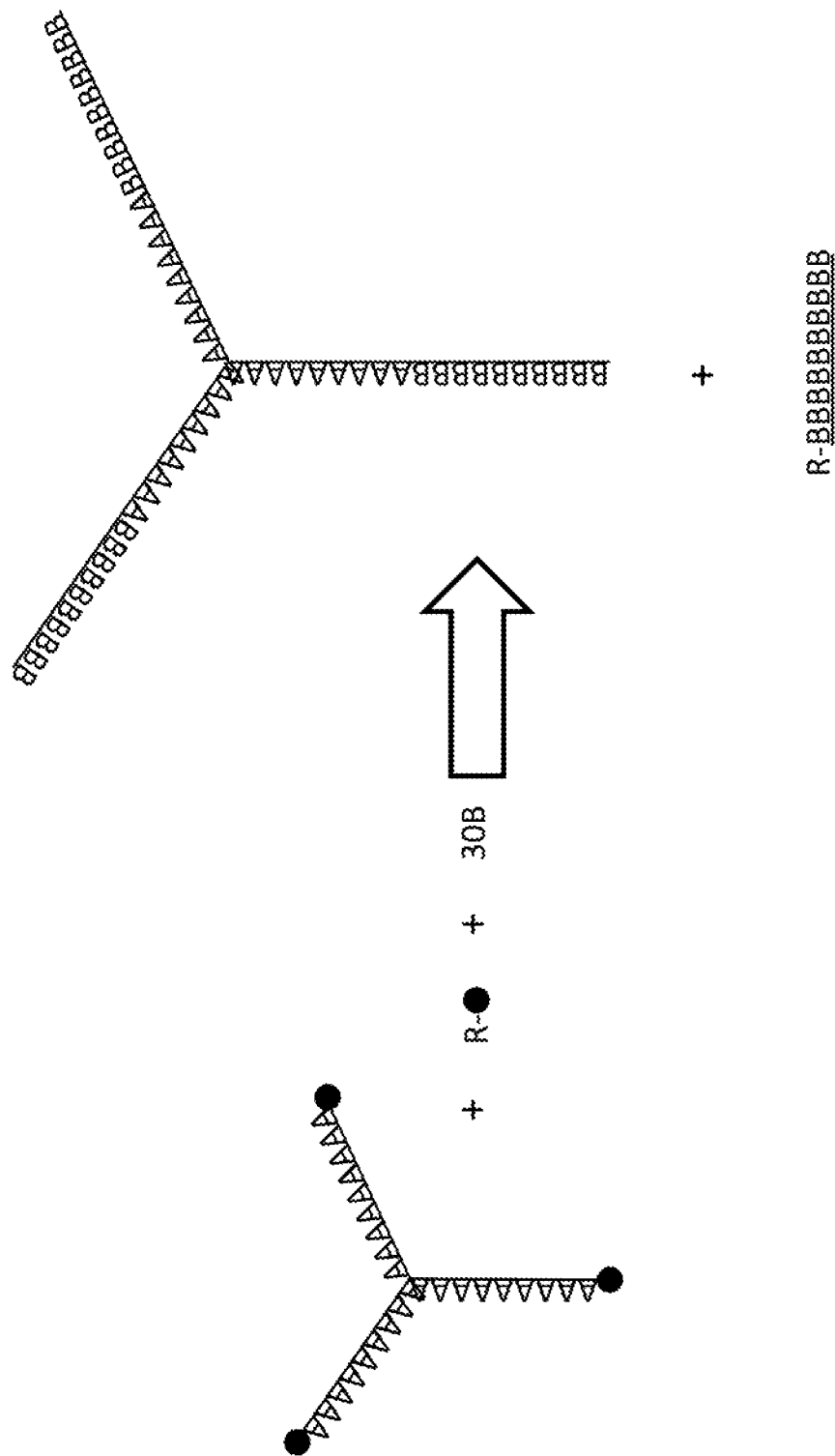
FIG. 4 provides an exemplary representation of a further embodiment of the method disclosed herein.

Of course, the disclosed method is not limited, e.g., to monofunctional and difunctional initiators. FIG. 4 provides a representation of an embodiment wherein Polymer A is tri-functional (i.e., having three initiation sites) and the Initiator is monofunctional (i.e., having one initiation site). As shown therein, the resulting blend comprises a three-armed Polymer A-B (with each arm comprising an interior A block at the center of the "star" and a B block at the exterior) and a linear Polymer B. Further embodiments can get increasingly complex, by incorporating additional Initiators, Monomers, and the like. FIGS. 5A-5E are exemplary such embodiments, which build on the general Method 10 outlined in FIG. 1.

Figure 5A:
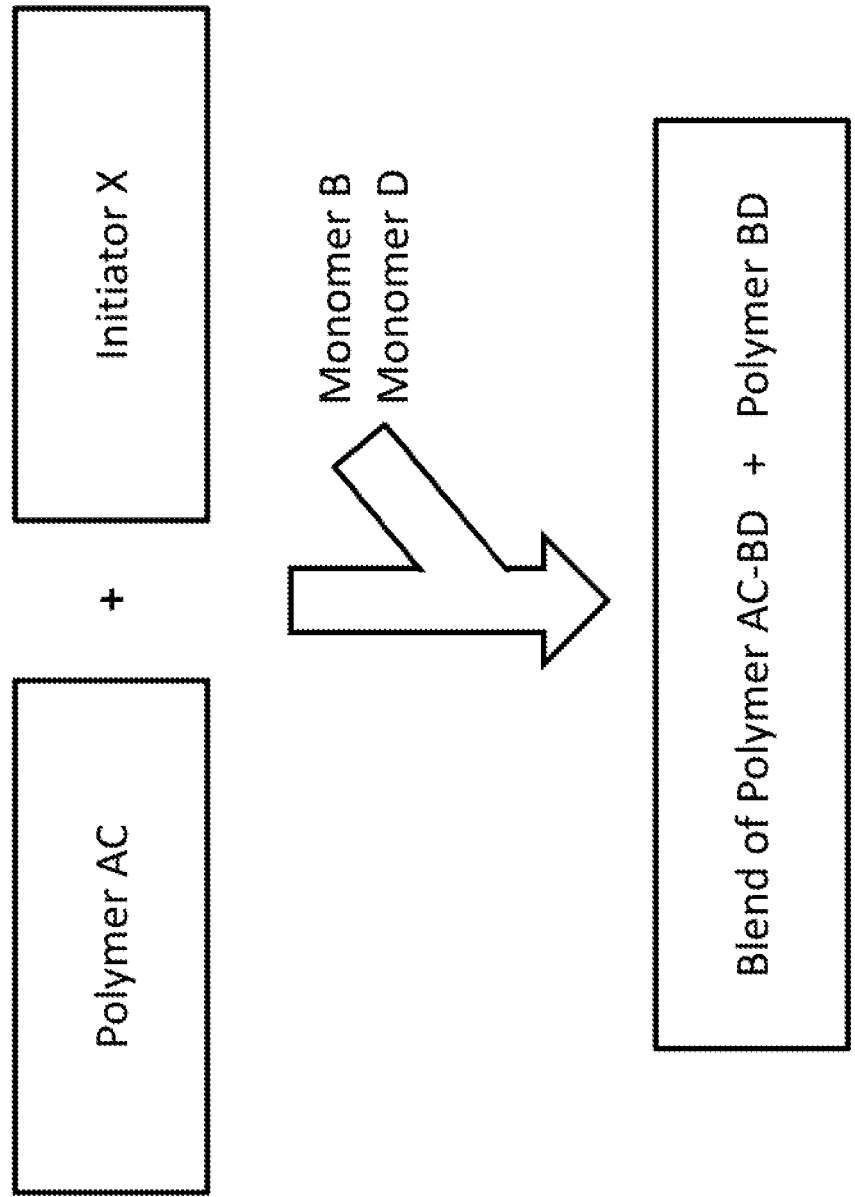
FIGS. 5A, 5B, 5C, and 5D are schematic representations of further, more specific embodiments of the method disclosed herein with varying types and amounts of reactants.
Figure 5B:
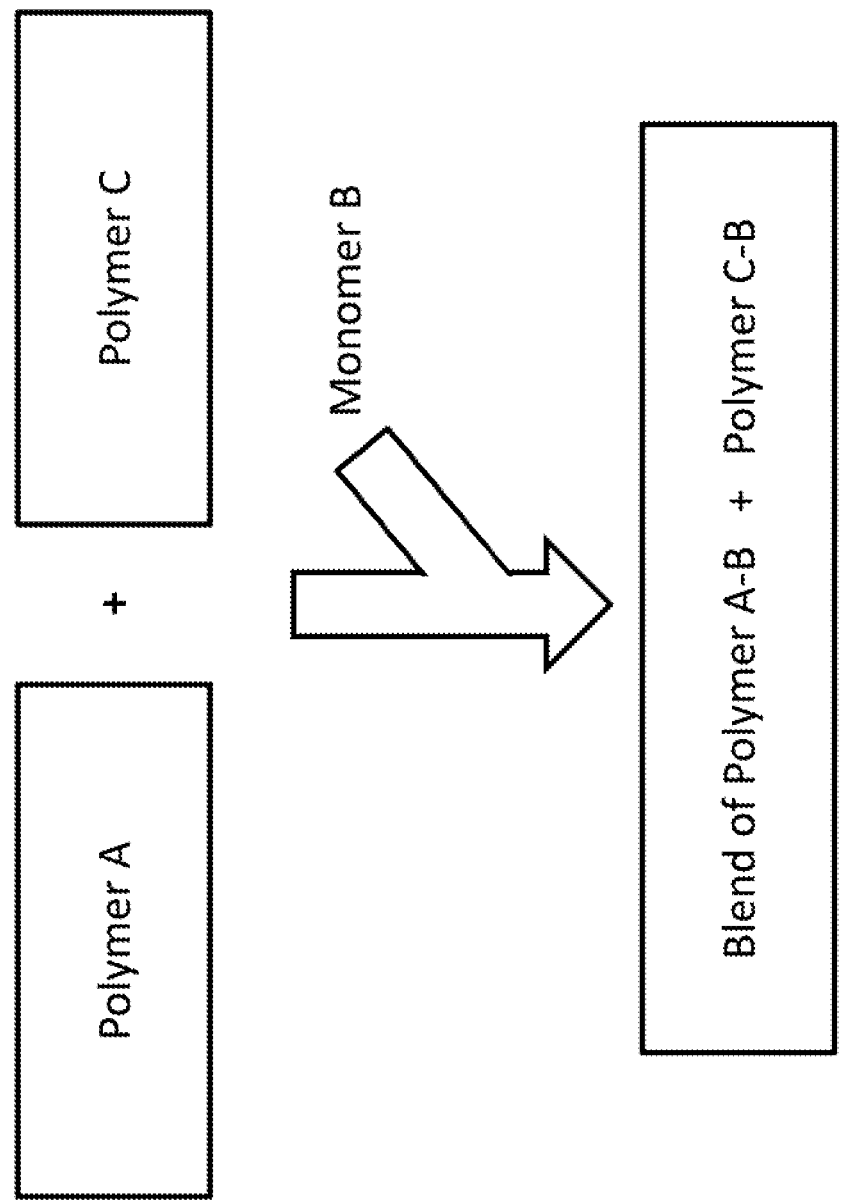

In FIG. 5A, Method 30 is illustrated, which is a modification to Method 10 provided in FIG. 1, wherein the polymer combined with the Initiator X is a copolymer (Polymer AC) rather than a homopolymer and Initiator X and Polymer AC are combined with two monomers (B and D), rather than just one under conditions sufficient to produce copolymers (Polymer AC-BD from Polymer AC and Polymer BD from Initiator X). The monomers may be added together or separately and, as such, the "BD" component of the products can be in the form of, e.g., a random copolymer, alternating copolymer, or block copolymer. It is noted that polymer AC can be provided or can be produced as part of the disclosed method, e.g., through the combination of an initiator (not shown) with Monomers A and C (not shown), e.g., simultaneously, which may provide, e.g., a random or alternating copolymer or in sequence, which may provide a block copolymer.

Figure 5C:
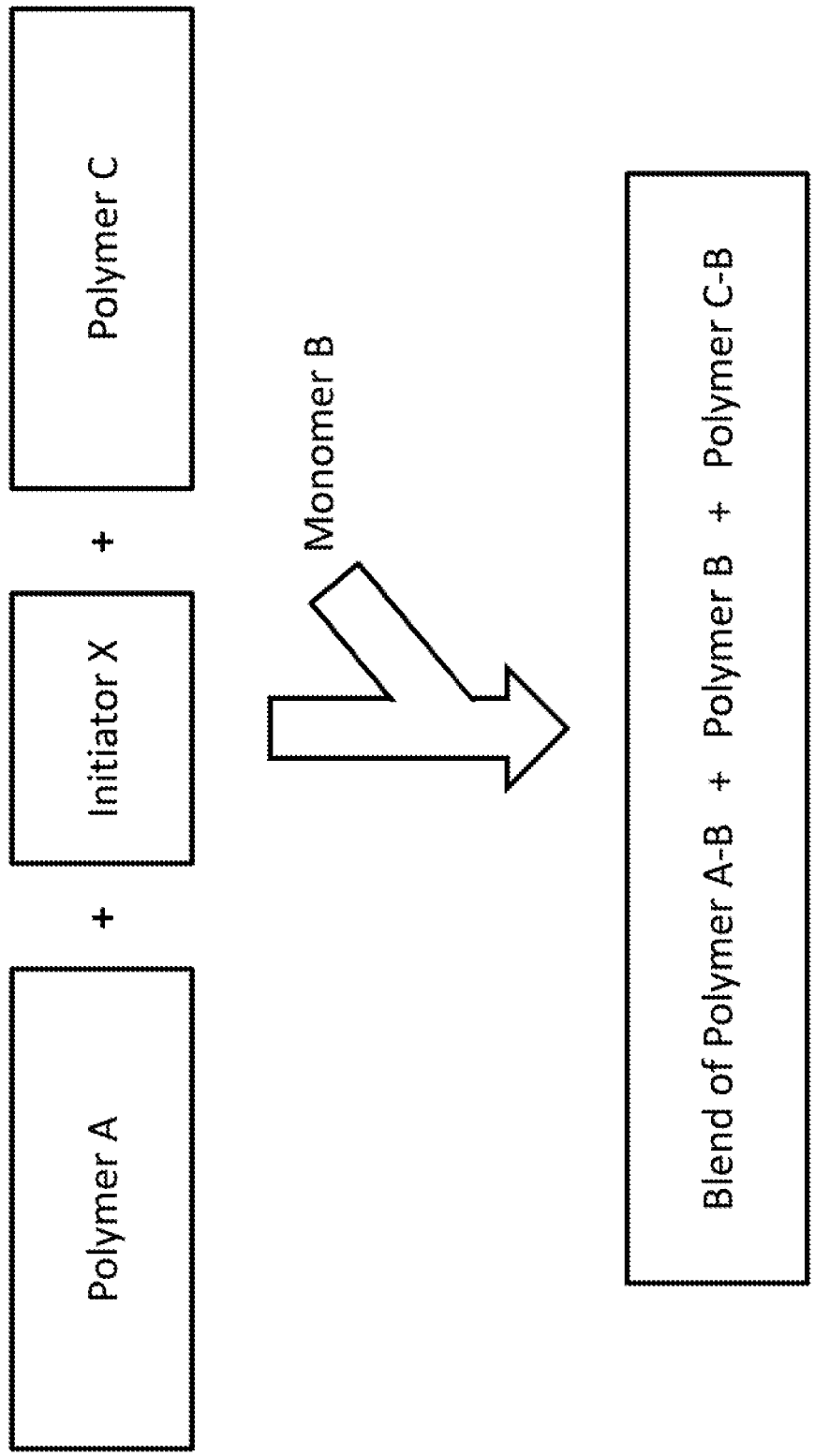

In FIG. 5B, again, the illustrated method (Method 40) is a modification to Method 10 in FIG. 1, wherein Initiator X is a macroinitiator (Polymer C). The result of reaction between Polymer A, the initiator, and Monomer B in this embodiment is a blend of two copolymers, e.g., Polymer A-B (Produced from Polymer A) and Polymer C-B (produced from Polymer C). FIG. 5C is a further modification (Method 50) to Method 10, wherein more than two components with initiation sites (functionalized for initiation of Monomer B) are combined with Monomer B to produce a blend. Here, three such initiator components are depicted (for example, Polymer A, Initiator X, and Polymer C); however, this number can vary. With these three components, reaction with Monomer B gives a blend comprising Polymer A-B (produced from Polymer A), Polymer B (produced from Initiator X), and Polymer C-B (produced from Polymer C).

Figure 5D:
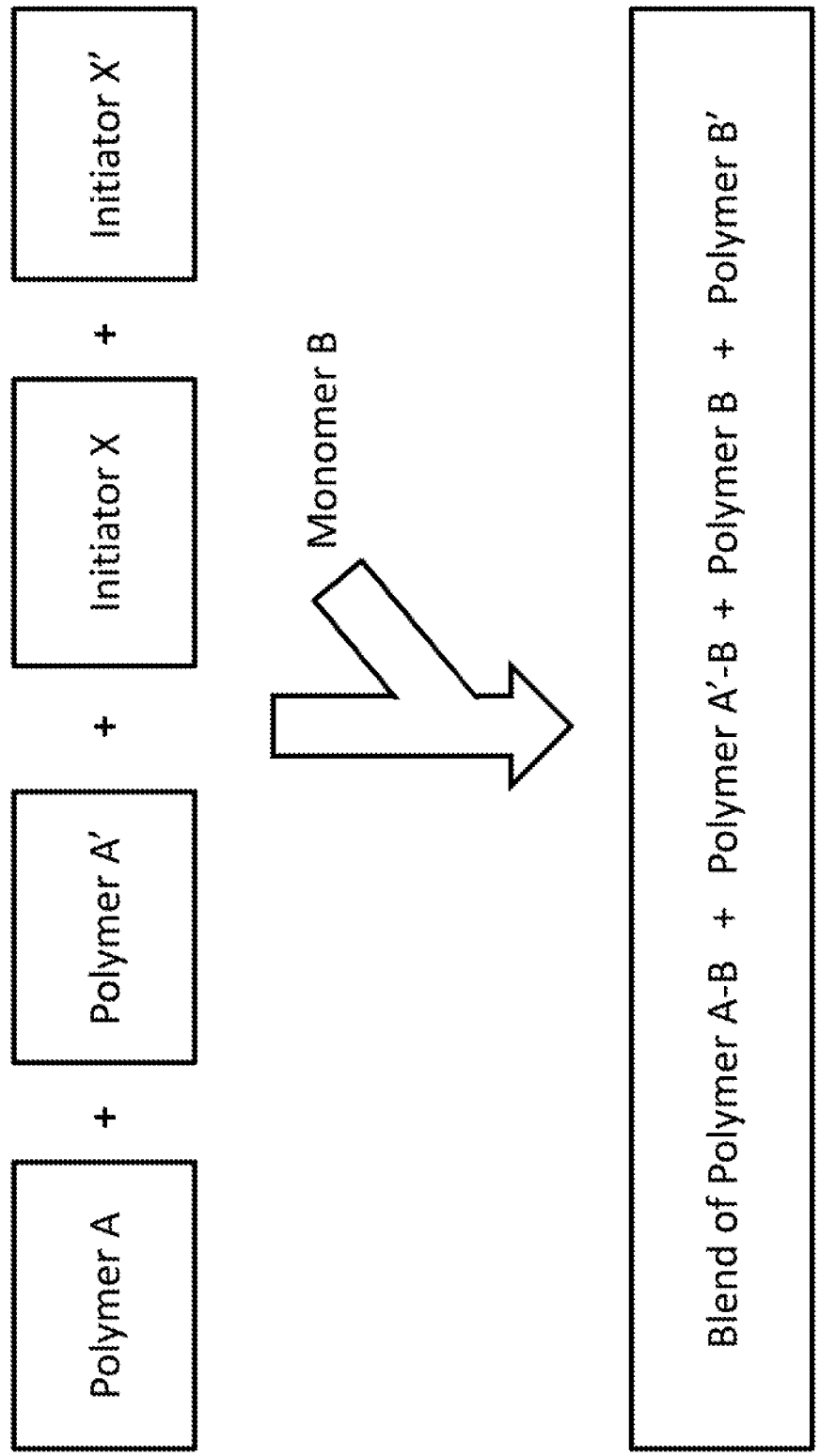
Figure 6C:
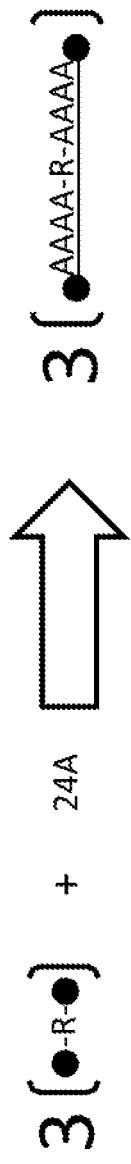
Figure 6D:
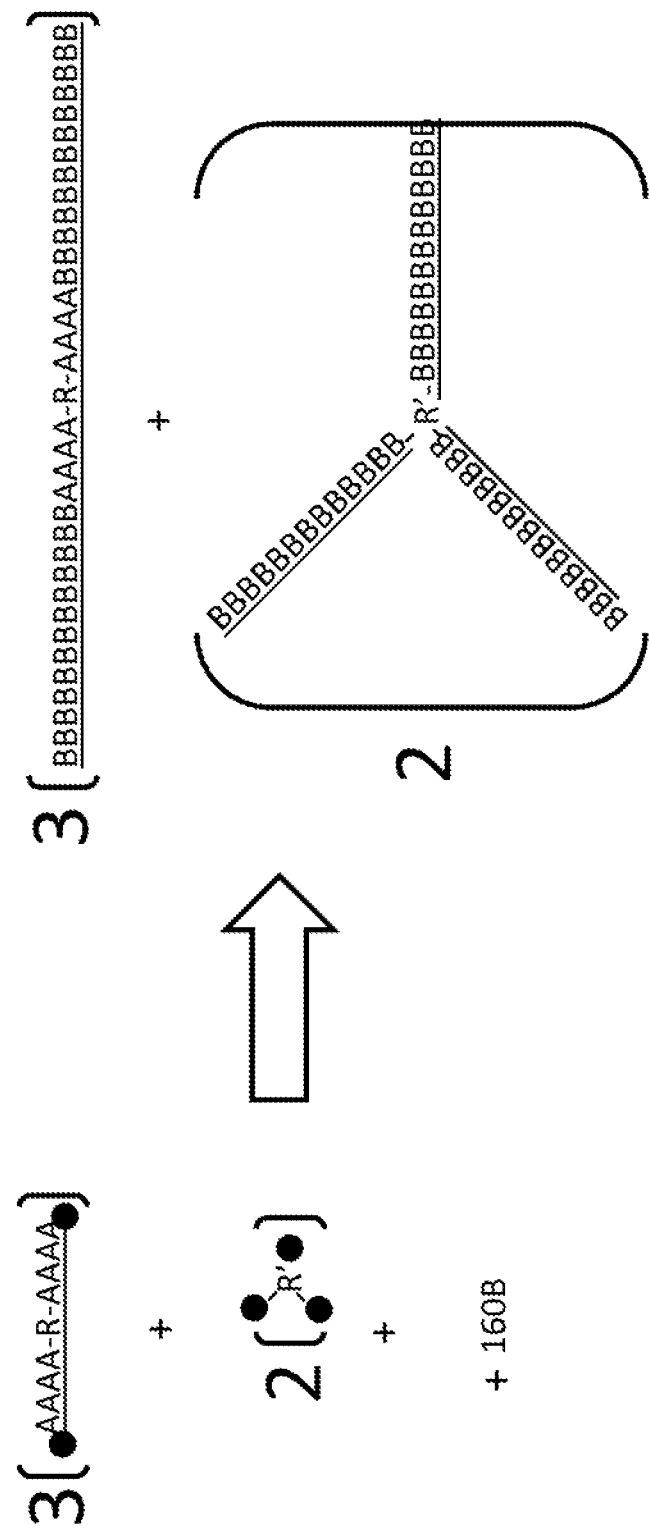
Figure 6E:
Figure 6F:
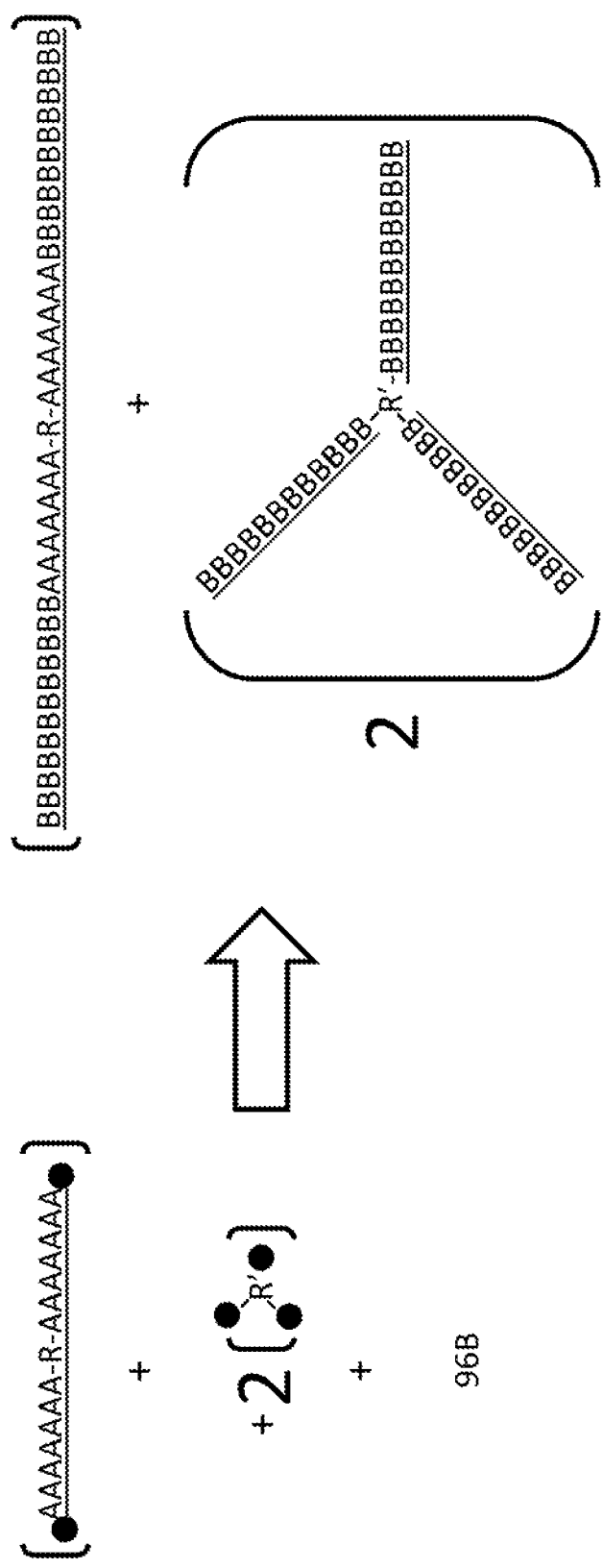

In FIG. 5D, a similar embodiment (Method 60) is shown; however, four different components serve as initiators for the polymerization reaction of Monomer B. In the depicted Example, Polymer A and Polymer A' may differ, e.g., only by the end group (e.g., the initiator from which Polymer A and Polymer A' were produced). In particular, the initiators used to prepare Polymer A and Polymer A' can have different numbers of initiation sites, such that Polymer A and Polymer A' have different numbers of arms/different numbers of initiation sites (e.g., Polymers A and A' may both be PCL, but Polymer A may be difunctional, having two end groups, each end group comprising an initiation site, and Polymer A' may be trifunctional, having three reactive end groups, each end group comprising an initiation site thereon). Similarly, Initiators X and X' may differ only in the number of initiator sites thereon (e.g., wherein Initiator X is a diol and Initiator X' is a triol). The result of Method 60 is a blend of Polymer A-B, Polymer A'-B, Polymer B, and Polymer B' (where Polymer A-B and Polymer A'-B statistically differ, in some embodiments, only by number of arms and individual molecular weight and Polymer B and B' statistically differ by end group, X and X' respectively (which can result in differences in the number of arms and individual molecular weights). As one example (consistent with the examples provided above), in a particular embodiment, Polymer A-B is a linear block copolymer, Polymer A'-B is a three-armed block copolymer, Polymer B is a linear homopolymer, and Polymer B' is a three-armed homopolymer. It is to be understood that this embodiment is not to be viewed as limiting and is merely exemplary of one particular system afforded by the referenced combination of reaction components.

As such, the disclosed methods generally involve a first polymerization reaction wherein any number of components capable of initiating the polymerization may be used, and such components can be non-polymeric or polymeric (including homopolymeric and/or copolymeric). The polymerization reaction results in a final blend comprising two or more polymers, wherein the final blend typically comprises a mixture of homopolymer(s) and copolymer(s). The disclosed methods generally involve the selection of the types and amounts of the initiators and monomers based on specific ratios of these components. Thus, there is a degree of control afforded by the disclosed method, based on the recognition identified herein that selecting certain values, e.g., specific reactants and ratios thereof can lead to an effectively blended product with desired physical properties. It is noted that the polymerization reactions disclosed herein are described in a theoretically ideal sense and one of skill in the art will recognize that polymerizations do not always proceed in a theoretically ideal sense. For example, the reactivity of all initiation sites/reactive sites/end groups may not be identical due to, e.g., the local environment of a given initiator/reactive site. In addition, targeted polymer molecular weights (based on evaluation of number of end groups/initiation sites and amount of monomer) are not always achieved (theoretical Mn is commonly higher than actual Mn). Such phenomena are typical in polymerization systems and would be recognized by one of skill in the art and, as such, the general principles herein are understood to be directly applicable under the majority of polymer systems that are generally "controlled" as disclosed herein.

In a particular embodiment, various attributes of the final blend can be modified by adjusting the molar ratio of a first initiator (e.g., Polymer A) and second initiator (e.g., Initiator X). Where Method 20, as shown in FIG. 2 is employed, such molar ratio can be selected based on appropriate amounts of Initiator Y and Initiator X.

Certain examples of adjusting initiator ratios and initiation site ratios on such initiators are illustrated in FIGS. 6A-6F, wherein • refers to an initiation site as referenced herein above. As shown in the figures, by selecting different ratios of a first and second initiator, various attributes of the final blend can be modified, including the following: 1) the relative amounts of Polymer A-B and Polymer B, 2) the relative molecular weights of Polymer A-B and Polymer B, 3) the relative lengths of the A segments/blocks of Polymer A-B, and 4) the relative lengths of the B segments/blocks/arms of Polymer A-B and Polymer B. For example, assuming comparable initiator functionalities and comparable molar ratios of overall monomer to overall initiator (e.g., comparable theoretical overall molecular weight in the final blend), different amounts of Polymer A-B and Polymer B, different molecular weights of Polymer A-B and Polymer B, different lengths of Polymer A segments, and different lengths of Polymer B segments are produced by selecting different ratios of the first initiator and the second initiator.

Certain equations that define various parameters and that help to demonstrate the modifications afforded by the selections (e.g., of initiators) as disclosed herein are provided herein below. These equations are understood to be applicable only to certain embodiments of the disclosed method. In particular, these equations refer, in some instances, to Initiator Y (see FIG. 2); however, they can be readily modified to encompass methods that do not include the step of producing Polymer A. For example, one of skill in the art will recognize that where Polymer A is independently provided, the number of moles of Initiator Y in the equations below is theoretically equivalent to the number of moles of Polymer A. It is further noted that these equations make certain assumptions, one of which is a strict interpretation of statistically controlled molecular weight.

$$\text{Weight}\% \,(\text{Polymer}A-B) = \frac{[Mn\,(\text{Polymer}A-B) \times \text{Moles}\,(\text{Initiator}Y)]}{[Mn\,(\text{Polymer}A-B) \times \text{Moles}\,(\text{Initiator}Y)] + [Mn\,(\text{Polymer}B) \times \text{Moles}\,(\text{Initiator}X)]} \times 100 \quad \text{Equation 1}$$

$$\text{Weight}\% \,(\text{Polymer}B) = \frac{[Mn\,(\text{Polymer}B) \times \text{Moles}\,(\text{Initiator}X)]}{[Mn\,(\text{Polymer}A-B) \times \text{Moles}\,(\text{Initiator}Y)] + [Mn\,(\text{Polymer}B) \times \text{Moles}\,(\text{Initiator}Y)]} \times 100 \quad \text{Equation 2}$$

$$Mn\,(\text{Blend}) = \left[ Mn\,(\text{Polymer}A-B) \times \frac{\text{Moles}\,(\text{Initiator}Y)}{(\text{Moles}\,(\text{Initiator}Y) + \text{Moles}\,(\text{Initiator}X))} \right] + \quad \text{Equation 3}$$
$$\left[ Mn\,(\text{Polymer}B) \times \frac{\text{Moles}\,(\text{Initiator}X)}{(\text{Moles}\,(\text{Initiator}Y) + \text{Moles}\,(\text{Initator}X))} \right]$$

$$Mn\,(\text{Polymer}A-B) = \quad \text{Equation 4}$$
$$Mn\,(\text{Polymer}A) + \left[ \frac{FW\,(\text{Monomer}B) \times \text{Moles}\,(\text{Monomer}B)}{[\text{Moles}\,(\text{Initiator}Y) \times \text{Reactive Sites}\,(\text{Initiator}Y)] + [\text{Moles}\,(\text{Initator}X) \times \text{Reactive Sites}\,(\text{Initiator}X)]} \right] \times$$
$$\text{Reactive Sites}\,(\text{Initiator}Y)$$

$$Mn\,(\text{Polymer}\,B) = \left[\frac{FW\,(\text{Monomer}\,B) \times \text{Moles}\,(\text{Monomer}\,B)}{[\text{Moles}\,(\text{Initiator}\,Y) \times \text{Reactive Sites}\,(\text{Initiator}\,Y)] + [\text{Moles}\,(\text{Initator}\,X) \times \text{Reactive Sites}\,(\text{Initiator}\,X)]}\right] \times \text{Reactive Sites}\,(\text{Initiator}\,X) \qquad \text{Equation 5}$$

$$Mn\,(\text{Polymer}\,A) = \frac{FW\,(\text{Monomer}\,A) \times \text{Moles}\,(\text{Monomer}\,A)}{[\text{Moles}\,(\text{Initiator}\,Y)]} \qquad \text{Equation 6}$$

In some embodiments, the disclosed blends can be described as one blend component being "dispersed in" another blend component. Typically, a component present in a smaller overall amount is viewed as being dispersed within a component present in a greater amount (which can be referred to as the "matrix"). In the foregoing exemplary embodiment of the disclosed method, the blend can be viewed as comprising Polymer A dispersed within a matrix of Polymer B segments (including blocks and homopolymer). The degree of dispersion of Polymer A within the Polymer B matrix can be adjusted by selecting the number of initiation sites and molar ratios of the first and second initiator (e.g., Polymer A and Initiator X) used to produce the blends of Polymer A-B and Polymer B. This degree of control can allow one of skill in the art to select such first and second initiator end group/initiation site numbers and molar ratios to provide blend properties related to extent of dispersion of one type of polymer in another, including, but not limited to, toughness, elasticity, flexibility, rigidity, strength, resilience, impact resistance, elongation properties, fracture toughness, strength, thermal stability, melting point range or glass transition temperature range, optical clarity or opacity, degradability, biodegradability, absorbability, bioabsorbability, resorbability, and bioresorbability.

In one particular embodiment, Polymer A is PCL and Monomer B is L-lactide. According to the disclosed method, when these components are combined under appropriate conditions in the presence of Initiator X, the resulting blend comprises PCL-PLLA copolymer and PLLA homopolymer. Such embodiments provide for the incorporation/dispersion of a relatively "tough" material with low glass transition temperature, e.g., poly(caprolactone), throughout a material with a high glass transition temperature, e.g., PLLA. It is noted that the foregoing description focuses principally on processes wherein Monomer B is used to form polymers from two initiators, for example, Polymer A and Initiator X. However, this method is understood to have much broader applicability and can be employed in various other contexts as well. For example, the starting material mixture comprising Polymer A, Initiator X, and Monomer B may further comprise one or more additional components capable of initiating polymerization of Monomer B (which additional components can be polymeric (macroinitiators) or non-polymeric initiators).

The disclosed method provides, in some embodiments, for mixing of two (or more) polymeric species at the molecular level in the reaction mixture as, e.g., Polymer B components (and/or other polymeric components, e.g., Polymer D components, see FIG. 5A) are being produced. Advantageously, this process can lead to more homogeneous mixing of the two (or more) polymeric components in the resulting blend than would be achieved, e.g., by independently preparing the two (or more) components and subsequently mixing them. Another benefit afforded by the disclosed process is a high level of control over molecular weight of individual polymer chains, which can further facilitate blending of the two (or more) components. Based on living polymerization principles, as referenced herein above, it is anticipated that the Polymer B component of all blend components will have statistically identical chemical compositions and statistically identical molecular weights, which can promote compatibility and/or improve dispersability of the blend components.

The disclosure also provides a polymeric blend comprising a copolymer and a homopolymer prepared according to the disclosed methods, wherein the blend can, in some embodiments, exhibit more uniform mixing (e.g., higher homogeneity) than polymeric blends prepared using traditional (post-synthesis) blending techniques. Such relatively uniform mixing can be evaluated, e.g., using techniques including, but not limited to, scanning electron microscopy (SEM), x-ray diffraction (XRD), atomic force microscopy (AFM) (wherein domain sizes can be evaluated by modulus), selective solubility, tensile and elongation properties, dynamic mechanical spectroscopy (DMS), impact strength (where low temperature testing can be conducted to differentiate effects of dispersion and domain size of hard and soft segments), fluorescence tagging, phase staining, $^1$H nuclear magnetic resonance (NMR) spectroscopy, $^{13}$C NMR spectroscopy, infrared spectroscopy, and/or gel permeation chromatography (GPC). Any one or more of these methods can, in some embodiments, be used to demonstrate improved homogeneity of certain blends.

The disclosure describes methods and systems for preparing polymer mixtures and, in particular, to methods and systems for preparing polymer mixtures comprising at least one copolymer. One such advantage to the methods and systems described herein is the ability to obtain a resin blend that has not been subjected to thermal degradation due to additional processing such as melt blending or solution blending. One of ordinary skill in the art will appreciate that that thermal degradation of a desired material is known to alter one or more of its mechanical properties, molecular weight, composition, morphology, shelf life stability, and degradation rate, thereby commonly rendering the material unsuitable for the intended application.

The ratios of the polymeric components in the blend can vary, as is evident based on the method outlined herein above. Although not limited thereto, the Polymer B component, prepared by polymerization of Monomer B from both Polymer A and the Initiator, is commonly present in a greater amount, e.g., greater than about 50% by weight of the blend, greater than about 60% by weight of the blend, or greater than about 75% by weight of the blend. In some embodiments, Polymer B has a higher molecular weight than Polymer A-B (e.g., where the number of initiation sites on Initiator X is greater than the number of initiation sites/end groups on Polymer A).

The disclosure further provides products comprising such polymeric blends, which may benefit from the enhanced homogeneity. In particular, although not limited thereto, medical products and devices comprising such polymeric blends are provided. Exemplary such medical products and devices, which may comprise a polymeric blend as disclosed herein, include, but are not limited to, stents, tubes, prosthetics, scaffolds, implants, endoprostheses, screws, pins, staples, and the like and other medical devices generally.

In some exemplary embodiments, the blends disclosed herein may find particular use in certain biological applications including, but not limited to: bioabsorbable vascular scaffolds with enhanced combinations of toughness and strength, and modulated absorption profiles, bioabsorbable monofilament sutures with high knot strength, high knot security, high compliancy, and modulated absorption profiles, bioabsorbable multifilament yarn and braided sutures with high knot strength, high knot security, and modulated absorption profiles, bioabsorbable liquids, gels, and/or gel-formers with modulated molecular weight distributions for controlled drug delivery, tissue engineering scaffolds, biological sensors, bioabsorbable products such as fibers, films, sheets, tubes, non-wovens, and coatings with high elasticity and modulated absorption profiles, and bioabsorbable products with enhanced interactions with biological environments including increased lubricity, biocompatibility, dimensional changes (e.g., shrinking, elongating) and volume changes (e.g., swelling). In other embodiments, the disclosed blends provided according to the present disclosure can be used in other contexts, e.g., including but not limited to, serving as heat shrink materials.

Stents are generally cylindrically shaped devices often used in the treatment of arterial disease. Arterial disease involves the deposition of lipids within an artery and subsequent plaque formation along the arterial wall. These plaque lesions may be soft or become hard and calcified and over time reduce the luminal space within the vessel, a process known as stenosis. To treat stenosis, stents are commonly deployed at the treatment site serving to maintain patency of the lumen of the diseased segment of the vessel. Stents must have adequate radial strength to provide the vessel with adequate radial support to maintain vessel patency. Stents may be deployed in various body lumens for a variety of purposes. Stents may be deployed, for example, in the central venous system for a variety of therapeutic purposes including the treatment of occlusions within the lumens of that system. It will be appreciated that certain products prepared from blends according to the current disclosure may be, e.g., stents designed for the central venous (CV) system, coronary vasculature, peripheral vasculature (PV), abdominal aortic aneurism (AAA) stents, bronchial stents, esophageal stents, biliary stents, or any other stent. Further, the blends of the present disclosure may equally be applicable to other prosthesis such as grafts.

In many clinical treatment applications, the stent is temporarily required, for example, to maintain patency during a critical healing phase or to deliver an active agent or a drug to a target site. Therefore, stents fabricated from bioabsorbable materials such as bioabsorbable polymers are able to meet this additional clinical requirement since they can be completely absorbed after their clinical utility has ended. Polymeric biodegradable tubes generally comprise one or more biodegradable polymers, e.g., including, but not limited to, poly(L-lactide) (PLLA), poly(D-lactide) (PDLA), poly(D,L-lactide) (PDLLA), poly(ε-caprolactone) (PCL), polyglycolic acid (PGA), poly(para-dioxanone) (PDO), poly(trimethylene carbonate) (PTMC), poly(hydroxybutyrate), poly(hydroxyvalerate), poly(tetramethyl carbonate), and copolymers, blends, and derivatives thereof. Selection of the polymers of the blends disclosed herein can have implications on both the biocompatibility/toxicity properties of the resulting tube and/or any device or component made therefrom and the physical/mechanical properties of the resulting tube and/or any device or component made therefrom, e.g., rate of degradation, strength (e.g., radial strength), and recoil rate. The ability to tailor the composition and physical properties of the blends, as disclosed herein, allows for the production of such products exhibiting combinations of useful properties (e.g., strength and biodegradability, allowing them, in some embodiments, be completely absorbed after their clinical utility has ended). Products produced from the blends disclosed herein can be processed/modified accordingly to serve a desired purpose in this regard, e.g., by cutting into an appropriate size/geometry.

The disclosed blends can, in some embodiments, be formed into medical devices or components of medical devices by various methods, including, but not limited to, compression molding, injection molding, blow molding, extrusion, and lamination. In particular, suitable methods for producing such devices and components include, but are not limited to, the methods disclosed in U.S. Pat. No. 8,444,688 to Sherry; U.S. Pat. No. 8,268,228 to Huang et al.; U.S. Pat. No. 8,128,982 to Neary; U.S. Pat. No. 7,318,944 to Neary; U.S. Pat. No. 5,997,568 to Liu; U.S. Pat. No. 5,897,911 to Leoffler; U.S. Pat. No. 4,950,258 to Kawai et al, and U.S. Pat. No. 4,820,298 to Leveen et al., and U.S. Patent Application Publication No. 2012/0158123 to Borck; which are incorporated herein by reference. As such, in certain embodiments, the disclosed method further comprises forming the blend into a medical device or component thereof, e.g., into a stent or a portion thereof.

Stents are commonly manufactured by laser cutting a tube to into a radially expandable geometry comprising interconnected structural elements or struts. During conventional deployment as with an angioplasty balloon catheter, the stent struts undergo high localized deformation, requiring the material from which the stents are manufactured to be highly deformable while maintaining high strength and rigidity (e.g. the material must exhibit high toughness). In many clinical treatment applications, the stent is required only temporarily, for example, to maintain patency during a critical healing phase or to deliver an active agent or a drug to a target site.

Embodiments of the present disclosure are further illustrated by the following examples, which are set forth to illustrate the presently disclosed subject matter and are not to be construed as limiting.

EXPERIMENTAL

In Examples 2, 3, 10 and 11, polymer blends were produced according to various embodiments of the method disclosed herein. Examples 2, 3, 10 and 11 provide exemplary methods of producing certain blends comprising poly(epsilon-caprolactone) (PCL) and poly(L-lactide) (PLLA). The blends have controlled blend component weight percentages and controlled blend component relative molecular weights. For each blend, the overall PCL/PLLA content was either 5%/95% by weight (Example 10) or 10%/90% by weight (Examples 2, 3, and 11). A diol initiator was used to produce "Polymer A", such that Polymer A was a linear PCL with two initiation sites. Polymer A, comprising PCL, was combined with a triol initiator (Initiator X) and L-lactide (Monomer B), resulting in a blend of a tri-block copolymer of PLLA-PCL-PLLA (as Polymer A-B, according to Method 10 in FIG. 1) and a triaxial (e.g., three-armed) homopolymer of PLLA (as Polymer B, according to method 10 in FIG. 1). To produce the blends with controlled PCL dispersion, the overall weight % of Polymer A in the blend and/or the molar ratio of the first and second initiator (Polymer A and Initiator X) were varied, based on the ratio of the diol initiator and the triol initiator, while keeping the total moles of initiator unchanged. As a result, blends with comparable overall number average molecular weights (Mn) were produced with varying molecular weights of the PCL block in Polymer A-B and varying weight percentages of Polymer A-B and Polymer B. IV data are provided in FIG. 8 for Polymer A of each Example 2, 3, 10 and 11. DSC data are provided in FIG. 8 for the heat of fusion attributed to the melting of the PCL dispersed phase in the polymeric blends of each Example 2, 3, 10 and 11. The IV data of FIG. 8 shows a good correlation between the IV of Polymer A and the theoretical Mn of Polymer A, indicating good control of the molecular weight of Polymer A for the disclosed method. The DSC data of FIG. 8 shows a good correlation between the theoretical Mn of Polymer A and the heat of fusion attributed to the melting of the PCL dispersed phase in the polymeric blends indicating good control of the size of the PCL dispersed phase in the polymeric blends for the disclosed method. One of ordinary skill in the art will appreciate that the larger the dispersed phase within a continuous phase, the more probable the dispersed phase will exhibit properties inherent to the material(s) that makes up the dispersed phase, including, but not limited to, thermal properties such as melting enthalpy (heat of fusion).

The resin blend in connection with Example 1 was obtained by method 10 as illustrated in FIG. 1. The resin blend in connection with Example 14 was obtained by melt blending. The overall PCL/PLLA content was 10%/90% by weight was the same for both blends and the blend components were analogues of each other. The IV of the resin blend obtained in connection with Example 1 was 3.4±0.1 dL/g. The blend components in connection with Example 14, Polymer A-B analogue of Example 1 and Polymer B analogue of Example 1, were 3.3±0.1 dL/g and 3.5±0.0 dL/g, respectively. The IV of the resin blend obtained in connection with Example 14 was 2.3±0.2 dL/g. The different in IV between the resin blend in connection with Example 14 and the blend components of the resin in connection with Example 14 is attributed to the thermal degradation of the blend components of Example 14 during the melt blending process.

DSC data for the polymeric blends of select Examples provided herein below are provided in FIGS. 7 and 8. The DSC data in FIG. 7 were collected using the polymeric blends in granular form after being removed from a reactor, ground at low temperature, and allowed to come to room temperature. The DSC data in FIG. 8 were collected using polymeric blends in a melt-pressed plaque form after being melt-pressed using on a Carver Press based on the following program: 1) Sample pre-heat for 2 minutes at 240° C.; 2) Press to 1.5 metric tons; 3) Isothermal hold for 30 seconds; 4) Quench in liquid nitrogen; 5) Return to room temperature. The DSC data was obtained using a TA Instruments Q2000 instrument and based on the following program: 1) Equilibrate at −40.00° C.; 2) Isothermal for 1.00 min; 3) Ramp 10.00° C./min to 240.00° C.; 4) Isothermal for 1.00 min; 5) Mark end of cycle 1; 6) Ramp 10.00° C./min to −40.00° C.; 7) Isothermal for 1.00 min; 8) Mark end of cycle 2; 9) Ramp 10.00° C./min to 240.00° C.; 10) Isothermal for 1.00 min; 11) Mark end of cycle 3; 12) End of method.

Inherent Viscosity (IV) data for select polymeric initiators, polymeric blend component analogues, and polymeric blends of select Examples provided herein below are provided in FIGS. 8 and 9. IV measurements were conducted to qualitatively confirm that polymerization had proceeded (with an increase in IV indicating the reaction of monomer to produce polymer), and to determine relative molecular weights of polymeric initiators, polymeric blend component analogues, and polymeric blends The inherent viscosity was measured using: chloroform at 25° C., the ASTM D2857 procedure "Standard Practice for Dilute Solution Viscosity of Polymers", and a YSI Incorporated AVS 370 semi-automated viscosity measurement system consisting of AVS 370 measuring unit, AVS/SK optical measuring stand, CT 72 thermostatic water bath, a Ubbelohde 0c viscometer and Win Visco 370 software.

GPC data for the polymeric blends and polymeric blend component analogues of select Examples provided herein below are provided in FIG. 9. The GPC data were obtained using an instrument equipped with two 300×7.8 mm Tosoh GMH$_{HR}$-H columns, a Wyatt Technology OptiLab T-rEX refractive index detector, and chloroform as the mobile phase. The instrument was calibrated using twelve polystyrene standards ranging from 162 to 6,570,000 g/mol to establish a calibration curve of log (molar mass) versus retention volume. GPC data was used to compare the relative molar mass distributions of the polymeric blends and polymeric blend component analogues.

In Examples 1-3 and 11, polymer blends were produced according to the method disclosed herein. Examples 1-3 and 11 provide exemplary methods of producing certain blends comprising poly(epsilon-caprolactone) (PCL) and poly(L-lactide) (PLLA). The blends have controlled blend component weight percentages and controlled blend component relative molecular weights. For each blend, the overall PCL/PLLA content was 10%/90% by weight. A diol initiator was used to produce "Polymer A," such that Polymer A was a linear PCL with two initiation sites. Polymer A, comprising PCL, was combined with a triol initiator (Initiator X) and L-lactide (Monomer B), resulting in a blend of a tri-block copolymer of PLLA-PCL-PLLA (as Polymer A-B, according to Method 10 in FIG. 1) and a triaxial (e.g., three-armed) homopolymer of PLLA (as Polymer B, according to method 10 in FIG. 1). To produce the blends with controlled PCL dispersion, the molar ratio of the first and second initiator (Polymer A and Initiator X) were varied, based on the ratio of the diol initiator and the triol initiator, while keeping the total moles of initiator unchanged. As a result, blends with comparable overall number average molecular weights (Mn) were produced with varying molecular weights of the PCL block in Polymer A-B and varying weight percentages of Polymer A-B and Polymer B.

Example 1

Preparation and characterization of a statistically anticipated 66/34 weight % PLLA-PCL-PLLA triblock copolymer/triaxial PLLA homopolymer blend with a theoretical overall blend Mn of ~255,000 Da, a PLLA-PCL-PLLA triblock copolymer Mn of ~238,000 Da (with PCL block Mn of ~36,000 Da), and a PLLA homopolymer Mn of ~303,000 Da, produced with a first initiator (Polymer A) to second initiator (Initiator X) molar ratio of 5:2, based on the ratio of the diol initiator and the triol initiator In a reactor with a mixing stirrer, 0.21 g (0.00278 moles) of 1,3-propanediol, 100 g (0.88 moles) of epsilon-caprolactone, and 890 µL of a 0.2M tin(II)2-ethylhexanoate in toluene solution were combined and allowed to stir and react between 140° C. and 180° C. for 0.25 day to 1 day. A sample of the resultant PCL polymer was determined to have inherent viscosity (IV) of 0.9±0.0 dL/g. The polycaprolactone was cooled between 100° C. and 120° C. After two hours from temperature decrease, 900 g (6.25 moles) of L-Lactide and 0.15 g (0.00112 moles) of trimethylolpropane were added to the reaction vessel. The mixture was allowed to stir and mix for about 1 to 3 hours to allow the L-Lactide to fully melt and the components to disperse, then 550 µL of a 0.2M tin(II)2-ethylhexanoate in toluene solution was added. The temperature was increased between 121° C. and 180° C. and the system was heated for 3 days to 5 days. The resultant blend of PLLA-PCL-PLLA and PLLA was found to have an IV of 3.4±0.1 dL/g.

Example 2

Preparation and characterization of a statistically anticipated 55/45 weight % PLLA-PCL-PLLA triblock copolymer/triaxial PLLA homopolymer blend with a theoretical overall blend Mn of ~255,000 Da, a PLLA-PCL-PLLA triblock copolymer Mn of ~235,000 Da (with PCL block Mn of ~43,000 Da), and a PLLA homopolymer Mn of ~287,000 Da, produced with a first initiator (Polymer A) to second initiator (Initiator X) molar ratio of 3:2, based on the ratio of the diol initiator and the triol initiator In a reactor with a mixing stirrer, 0.18 g (0.00234 moles) of 1,3-propanediol, 10 g (0.88 moles) of epsilon-caprolactone, and 712 µL of a 0.2M tin(II)2-ethylhexanoate in toluene solution were combined and allowed to stir and react at 140° C. and 180° C. for 0.25 day to 1 day. A sample of the resultant PCL polymer was determined to have inherent viscosity (IV) of 1.0±0.0 dL/g. The polycaprolactone was cooled between 100° C. and 120° C. After two hours from temperature decrease, 900 g (6.25 moles) of L-Lactide and 0.21 g (0.00157 moles) of trimethylolpropane were added to the reaction vessel. The mixture was allowed to stir and mix for about 1 to 3 hours to allow the L-Lactide to fully melt and the components to disperse, then 700 µL of a 0.2M tin(II)2-ethylhexanoate in toluene solution was added. The temperature was increased between 121° C. and 180° C. and the system was heated for 3 days to 5 days. The resultant blend of PLLA-PCL-PLLA and PLLA was found to have an IV of 3.4±0.1 dL/g.

Example 3

Preparation and characterization of a statistically anticipated 32/68 weight % PLLA-PCL-PLLA triblock copolymer/triaxial PLLA homopolymer blend with a theoretical overall blend Mn of ~255,000 Da, a PLLA-PCL-PLLA triblock copolymer Mn of ~250,000 Da (with PCL block Mn of ~77,000 Da), and a PLLA homopolymer Mn of ~259,000 Da, produced with a first initiator (Polymer A) to second initiator (Initiator X) molar ratio of 1:2, based on the ratio of the diol initiator and the triol initiator In a reactor with a mixing stirrer, 0.10 g (0.0013 moles) of 1,3-propanediol, 100 g (0.88 moles) of epsilon-caprolactone, and 356 µL of a 0.2M tin(II)2-ethylhexanoate in toluene solution were combined and allowed to stir and react at 140° C. and 180° C. for 0.25 day to 1 day. A sample of the resultant PCL polymer was determined to have inherent viscosity (IV) of 1.3±0.1 dL/g. The polycaprolactone was cooled to between 100° C. and 120° C. After two hours from temperature decrease, 900 g (6.25 moles) of L-Lactide and 0.35 g (0.00261 moles) of trimethylolpropane were added to the reaction vessel. The mixture was allowed to stir and mix for about 1 to 3 hours to allow the L-Lactide to fully melt and the components to disperse, then 1070 µL of a 0.2M tin(II)2-ethylhexanoate in toluene solution was added. The temperature was increased between 121° C. and 180° C. and the system was heated for 3 days to 5 days. The resultant blend of PLLA-PCL-PLLA and PLLA was found to have an IV of 2.8±0.2 dL/g.

Example 4

Preparation of a statistically anticipated 76/24 weight % PGA-PCL-PGA triblock copolymer/triaxial PGA homopolymer blend with a theoretical overall blend Mn of ~100,000 Da, a PGA-PCL-PGA triblock copolymer Mn of ~106,000 Da (with a PCL block Mn of ~49,000 Da), and a PGA homopolymer Mn of ~85,000 Da, produced with a first initiator (Polymer A) to second initiator (Initiator X) molar ratio of 5:2

In Example 4, the production of a polymer blend is described, comprising poly (epsilon caprolactone) (PCL) and poly(glycolide) (PGA). The overall PCL/PGA content is 35%/65% by weight. A diol initiator is used to produce "Polymer A," such that Polymer A is a linear PCL with two initiation sites. Polymer A, comprising PCL, is combined with a triol initiator (Initiator X) and glycolide (Monomer B), resulting in a blend of a tri-block copolymer of PGA-PCL-PGA (Polymer A-B, according to Method 10 of FIG. 1) and a triaxial (e.g., three-armed) homopolymer of PGA (Polymer B, according to Method 10 of FIG. 1). The first initiator (Polymer A) to second initiator (Initiator X) molar ratio, based on the ratio of the diol initiator and the triol initiator is 5:2.

In a reactor with a mixing stirrer, 0.544 g (0.00714 moles) of 1,3-propanediol, 350 g (3.07 moles) of epsilon-caprolactone, and 1239 µL of a 0.2M tin(II)2-ethylhexanoate in toluene solution are combined and allowed to stir and react at 140° C. and 180° C. for 0.25 day to 1 day. The polycaprolactone is cooled between 100° C. and 120° C. After two hours from temperature decrease, 650 g (5.60 moles) of glycolide and 0.383 g (0.00286 moles) of trimethylolpropane are added to the reaction vessel. The mixture is allowed to stir and mix for about 1 to 3 hours to allow the glycolide to fully melt and the components to disperse, and then the temperature is increased between 160° C. and 200° C. The system is heated under stirring conditions to produce polymer as confirmed by IV analysis.

Example 5

Preparation and characterization of a statistically anticipated 66/34 weight % PLDLA-PCL-PLDLA triblock copolymer/triaxial PLLA homopolymer blend with a theoretical overall blend Mn of ~255,000 Da, a PLDLA-PCL-PLDLA triblock copolymer Mn of ~238,000 Da (with a PCL block Mn of ~36,000 Da), and a PLLA homopolymer Mn of ~303,000 Da, produced with a first initiator (Polymer A) to second initiator (Initiator X) molar ratio of 5:2

In Example 5, a polymer blend was produced comprising poly (epsilon caprolactone) (PCL) and poly(L-lactide-co-D-lactide) (PLDLA). The overall PCL/PLDLA content was 10%/90% by weight with an L/D molar ratio of 98/2. A diol initiator was used to produce "Polymer A," such that Polymer A was a linear PCL with two initiation sites. Polymer A, comprising PCL, was combined with a triol initiator, L lactide, and D lactide, resulting in blend of a tri-block copolymer of PLDLA-PCL-PLDLA (Polymer A-B, according to Method 10 of FIG. 1) and a triaxial (e.g., three-armed) homopolymer of PLDLA (Polymer B, according to Method 10 of FIG. 1). The first initiator (Polymer A) to second initiator (Initiator X) molar ratio was 5:2, based on the ratio of the diol initiator and the triol initiator.

In a reactor with a mixing stirrer, 0.21 g (0.00278 moles) of 1,3-propanediol, 100 g (0.88 moles) of epsilon-caprolactone, and 890 µL of a 0.2M tin(II)2-ethylhexanoate in toluene solution were combined and allowed to stir and react at 140° C. and 180° C. for 0.25 day to 1 day. A sample of the resultant PCL polymer was determined to have inherent viscosity (IV) of 1.0±0.0 dL/g. The polycaprolactone was cooled between 100° C. and 120° C. After two hours from temperature decrease, 880 g (6.11 moles) of L-Lactide, 20 g (0.139 moles) of D-Lactide and 0.15 g (0.00112 moles) of trimethylolpropane were added to the reaction vessel. The mixture was allowed to stir and mix for about 1 to 3 hours to allow the L-Lactide and D-Lactide to fully melt and the components to disperse, and then the temperature was increased between 130° C. and 160° C. The system was heated for 3 days to 5 days. The resultant blend of PLDLA-PCL-PLDLA and PLDLA was found to have an IV of 3.3±0.1 dL/g.

Example 6

Preparation and characterization of a statistically anticipated 68/32 weight % PLLA-PCL-PLLA triblock copolymer/triaxial PLLA homopolymer blend with a theoretical overall blend Mn of ~255,000 Da, a PLLA-PCL-PLLA triblock copolymer Mn of ~244,000 Da (with a PCL block Mn of ~54,000 Da), and a PLLA homopolymer Mn of ~285,000 Da, produced with a first initiator (Polymer A) to second initiator (Initiator X) molar ratio of 5:2, based on the ratio of the diol initiator and the triol initiator In Example 6, a polymer blend was produced according to the method disclosed herein comprising PCL and PLLA. The overall PCL/PLLA content was 15%/85% by weight. A diol initiator was used to produce "Polymer A" such that polymer A was a linear PCL with two initiation sites. Polymer A was combined with a triol initiator (in a molar ratio of 5:2, based on the ratio of the diol initiator and the triol initiator) and L-lactide to produce a blend wherein the theoretical overall blend Mn was the same as in Examples 1-3.

In a reactor with a mixing stirrer, 0.21 g (0.00278 moles) of 1,3-propanediol, 150 g (1.31 moles) of epsilon-caprolactone, and 901 µL of a 0.2M tin(II)2-ethylhexanoate in toluene solution were combined and allowed to stir and react at 140° C. and 180° C. for 0.25 day to 1 day. A sample of the resultant PCL polymer was determined to have inherent viscosity (IV) of 1.3±0.1 dL/g. The polycaprolactone was cooled between 100° C. and 120° C. After two hours from temperature decrease, 855 g (5.9 moles) of L-Lactide and 0.15 g (0.00112 moles) of trimethylolpropane were added to the reaction vessel. The mixture was allowed to stir and mix for about 1 to 3 hours to allow the L-Lactide to fully melt and the components to disperse, then 540 µL of a 0.2M tin(II)2-ethylhexanoate in toluene solution was added. The temperature was increased between 121° C. and 180° C. and the system was heated for 3 days to 5 days. The resultant blend of PLLA-PCL-PLLA and PLLA was found to have an IV of 3.2±0.1 dL/g.

Example 7

Preparation and characterization of a statistically anticipated 65/35 weight % PLC-PCL-PLC triblock copolymer/triaxial PLC copolymer blend with a theoretical overall blend Mn of ~255,000 Da, a PCL block Mn of ~22,000 Da, a PLC-PCL-PLC triblock copolymer Mn of ~232,000 Da, and a PLC copolymer Mn of ~314,000 Da, produced with a first initiator to second initiator molar ratio of 5:2, based on the ratio of the diol initiator and the triol initiator.

In Example 7, a polymer blend was produced comprising poly (epsilon caprolactone) (PCL) and poly(L-lactide-co-caprolactone) (PLC). The overall C/L weight ratio is 10/90 with an L/C molar ratio of 95/5 in the poly(L-lactide-co-caprolactone). A diol initiator is used to produce "Polymer A," such that Polymer A was a linear PCL with two initiation sites. Polymer A, comprising PCL, is combined with a triol initiator (Initiator X), epsilon-caprolactone (Monomer B), and L-lactide (Monomer B and Monomer D), resulting in a blend of a tri-block copolymer of PLC-PCL-PLC (Polymer A-BD)) and a triaxial (e.g., three-armed) homopolymer of PLC (Polymer BD). The first initiator (Polymer A) to second initiator (Initiator X) molar ratio was 5:2, based on the ratio of the diol initiator and the triol initiator.

In a reactor with a mixing stirrer, 0.21 g (0.00278 moles) of 1,3-propanediol, 62.5 g (0.548 moles) of epsilon-caprolactone, and 890 µL of a 0.2M tin(II)2-ethylhexanoate in toluene solution were combined and allowed to stir and react at 140° C. and 180° C. for 0.25 day to 1 day. A sample of the resultant PCL polymer was determined to have inherent viscosity (IV) of 0.7±0.0 dL/g. The polycaprolactone was cooled between 100° C. and 120° C. After two hours from temperature decrease, 900 g (6.25 moles) of L-Lactide, 37.5 g (0.329 moles) of epsilon-caprolactone, and 0.15 g (0.00112 moles) of trimethylolpropane were added to the reaction vessel. The mixture was allowed to stir and mix for about 1 to 3 hours to allow the L-Lactide to fully melt and the components to disperse, and then the temperature was increased between 130° C. and 160° C. The system was heated for 3 days to 5 days. The resultant blend of PLC-PCL-PLC and PLC was found to have an IV of 3.3±0.1 dL/g.

Example 8

Preparation of a statistically anticipated 49/51 weight % PLLA-PCL-PLLA triaxial block copolymer/PLLA-PEG-PLLA linear triblock copolymer blend with a theoretical overall blend Mn of ~255,000 Da, a PLLA-PCL-PLLA triaxial block copolymer Mn of ~345,000 Da (with a PCL block Mn of ~70,000 Da), and a PLLA-PEG-PLLA triblock copolymer Mn of ~203,000 Da (with a PEG block Mn of ~20,000 Da), produced with a first initiator (Polymer A) to second initiator (Polymer C) molar ratio of 1:1.75, based on the ratio of the triol initiator and the PEG macroinitiator.

In Example 8, the production of a polymer blend is described, comprising poly (epsilon caprolactone) (PCL), poly(ethylene glycol) (PEG), and poly(L-lactide) (PLLA). The overall weight % of PEG/PCL/PLLA is 5/10/85. Polymer A, comprising PCL, is produced using a triol initiator (with three initiation sites), such that Polymer A is a triaxial PCL with three initiation sites. The triaxial PCL is combined with linear PEG (Polymer C, see FIG. 5B) with two initiation sites and L-lactide (Monomer B), resulting in a blend of a triaxial block copolymer of PLLA-PCL-PLLA (Polymer A-B) and a linear tri-block copolymer of PLLA-PEG-PLLA (Polymer C-B). The first initiator to second initiator molar ratio is 1:1.75, based on the ratio of the triol initiator and the PEG macroinitiator.

In a reactor with a mixing stirrer, 0.19 g (0.00143 moles) of trimethylolpropane, 100 g (0.88 moles) of epsilon-caprolactone, and 1695 µL of a 0.2M tin(II)2-ethylhexanoate in toluene solution are combined to stir and react at 140° C. and 180° C. for 0.25 day to 1 day. The polycaprolactone is cooled between 100° C. and 120° C. After two hours from temperature decrease, 50 g (0.0025 moles) of PEG with Mn of 20,000 Da and 850 g (5.90 moles) of L-Lactide are added to the reaction vessel. The mixture is allowed to stir and mix for about 1 to 3 hours to allow the L-Lactide and PEG to fully melt and the components to disperse, and then the temperature is increased between 130° C. and 160° C. The system is heated under stirring conditions to produce polymer as confirmed by IV analysis.

Example 9

Preparation of a statistically anticipated 74/26 weight % PCL-PLC-PCL triblock copolymer/PCL triaxial homopolymer blend with a theoretical overall blend Mn of ~120,000 Da, a PCL-PLC-PCL triblock copolymer Mn of ~124,000 Da (with a PLC block Mn of ~50,000 Da), and a PLC triaxial homopolymer Mn of ~110,000 Da, produced with a first initiator (Polymer A) to second initiator (Initiator X) molar ratio of 5:2, based on the ratio of the PCL macroinitiator and triol initiator.

In Example 9, the production of a polymer blend is described, comprising poly (L-lactide-co-caprolactone) (PLC) and poly(epsilon caprolactone) (PCL). The overall weight % of caprolactone/L-lactide is 74/26 and the PLC mole % of caprolactone/L-lactide is 15/85. The overall weight percent of PLC/PCL is 30/70. Polymer A, comprising PLC, is produced using a diol initiator (with two initiation sites), such that Polymer A is a linear PLC with two initiation sites. The linear PLC is combined with a triol initiator (Initiator X) with three initiation sites and caprolactone (Monomer B), resulting in a blend of a linear block copolymer of PCL-PLC-PCL (Polymer A-B) and a triaxial homopolymer of PCL (Polymer B). The first initiator to second initiator molar ratio is 5:2, based on the ratio of the PLC macroinitiator and the triol initiator.

In a reactor with a mixing stirrer, 0.453 g (0.00595 moles) of 1,3-propanediol, 263.2 g (1.828 moles) of L-lactide, 36.8 g (0.323 moles) of epsilon-caprolactone, and 2073 µL of a 0.2M tin(II)2-ethylhexanoate in toluene solution are combined and allowed to stir and react at 140° C. and 180° C. for 1 day to 4 days. The poly(L-lactide-co-caprolactone) is cooled between 130° C. and 160° C. After two hours from temperature decrease, 700 g (6.14 moles) of caprolactone and 0.320 g (0.00238 moles) of trimethylolpropane are added to the reaction vessel. The mixture is allowed to stir and mix to allow the components to disperse. The system is heated under stirring conditions to produce polymer as confirmed by IV analysis.

Example 10

Preparation and characterization of a statistically anticipated 64/36 weight % PLLA-PCL-PLLA triblock copolymer/triaxial PLLA homopolymer blend with a theoretical overall blend Mn of ~255,000 Da, a PLLA-PCL-PLLA triblock copolymer Mn of ~230,000 Da (with a PCL block Mn of ~18,000 Da), and a PLLA homopolymer Mn of ~319,000 Da, produced with a first initiator (Polymer A) to second initiator (Initiator X) molar ratio of 5:2, based on the ratio of the diol initiator and the triol initiator In Example 10, a polymer blend was produced according to the method disclosed herein comprising PCL and PLLA. The overall PCL/PLLA content was 5%/95% by weight. A diol initiator was used to produce "Polymer A" such that polymer A was a linear PCL with two reactive sites. Polymer A was combined with a triol initiator (in a molar ratio of 5:2, based on the ratio of the diol initiator and the triol initiator) and L-lactide to produce a blend wherein the theoretical overall blend Mn was the same as in Examples 1-3.

In a reactor with a mixing stirrer, 0.21 g (0.00278 moles) of 1,3-propanediol, 50 g (0.44 moles) of epsilon-caprolactone, and 879 µL of a 0.2M tin(II)2-ethylhexanoate in toluene solution were combined and allowed to stir and react at 140° C. and 180° C. for 0.25 day to 1 day. A sample of the resultant PCL polymer was determined to have inherent viscosity (IV) of 0.6±0.0 dL/g, an Mn of 23.7±0.2 kDa, an Mw of 45.5±0.3 kDa, an Mp of 37.2±0.7 kDa, and a polydispersity index of 1.93±0.01. The polycaprolactone was cooled between 100° C. and 120° C. After two hours from temperature decrease, 950 g (6.6 moles) of L-Lactide and 0.15 g (0.00112 moles) of trimethylolpropane were added to the reaction vessel. The mixture was allowed to stir and mix for about 1 to 3 hours to allow the L-Lactide to fully melt and the components to disperse. The temperature was increased between 121° C. and 180° C. and the system was heated for 3 days to 5 days. The resultant blend of PLLA-PCL-PLLA and PLLA was found to have an IV of 3.4±0.2 dL/g.

Example 11

Preparation and characterization of a statistically anticipated 66/34 weight % PLLA-PCL-PLLA triblock copolymer/triaxial PLLA homopolymer blend with a theoretical overall blend Mn of ~255,000 Da, a PLLA-PCL-PLLA triblock copolymer Mn of ~238,000 Da (with PCL block Mn of ~36,000 Da), and a PLLA homopolymer Mn of ~303,000 Da, produced with a first initiator (Polymer A) to second initiator (Initiator X) molar ratio of 5:2, based on the ratio of the diol initiator and the triol initiator In a reactor with a mixing stirrer, 0.21 g (0.00278 moles) of 1,3-propanediol, 100 g (0.88 moles) of epsilon-caprolactone, and 890 µL of a 0.2M tin(II)2-ethylhexanoate in toluene solution were combined and allowed to stir and react between 140° C. and 180° C. for 0.25 day to 1 day. A sample of the resultant PCL polymer was determined to have inherent viscosity (IV) of 0.9±0.0 dL/g. The polycaprolactone was cooled between 100° C. and 120° C. After two hours from temperature decrease, 900 g (6.25 moles) of L-Lactide and 0.15 g (0.00112 moles) of trimethylolpropane were added to the reaction vessel. The mixture was allowed to stir and mix for about 1 to 3 hours to allow the L-Lactide to fully melt and the components to disperse. The temperature was increased between 121° C. and 180° C. and the system was heated for 3 days to 5 days. The resultant blend of PLLA-PCL-PLLA and PLLA was found to have an IV of 3.3±0.0 dL/g.

In Examples 12-14, a polymer blend with a statistically anticipated 66/34 weight % PLLA-PCL-PLLA triblock copolymer/triaxial PLLA homopolymer blend with a theoretical overall blend Mn of ~255,000 Da, a PLLA-PCL-PLLA triblock copolymer Mn of ~238,000 Da (with PCL block Mn of ~36,000 Da), and a PLLA homopolymer Mn of ~303,000 Da.) was prepared by traditional melt blending. For the melt blend, the overall PCL/PLLA content was 10%/90% by weight. Analogues of Polymer A-B and Polymer B from Example 1 were produced independently of each other. Different blending techniques were used in connection with Examples 1 and 14. A diol initiator was used to produce the "Polymer A" analogue, such that Polymer A analogue was a linear PCL with two reactive sites. Polymer A analogue, comprising PCL, was combined with L-lactide (Monomer B) resulting in a tri-block copolymer of PLLA-PCL-PLLA (as Polymer A-B analogue). A triol initiator was used to produce a triaxial (i.e., three-armed) homopolymer of PLLA (as "Polymer B" analogue). To produce the blend, a mixture of Polymer A-B analogue and Polymer B analogue in a 66/34 weight % was melt blended via extrusion. Different blending techniques were used in connection with Examples 1 and 14.

Example 12

Preparation and characterization of a PLLA-PCL-PLLA triblock copolymer, PLLA-PCL-PLLA triblock copolymer Mn of ~238,000 Da (with PCL block Mn of ~36,000 Da). This PLLA-PCL-PLLA triblock copolymer is statistically anticipated to be equivalent to the blend component "Polymer A-B" in Example 1 and is referenced as "Polymer A-B" analogue.

In a reactor with a mixing stirrer, 0.32 g (0.00419 moles) of 1,3-propanediol, 150 g (1.31 moles) of epsilon-caprolactone, and 1140 µL of a 0.2M tin(II)2-ethylhexanoate in toluene solution were combined and allowed to stir and react at between 140° C. and 180° C. for 0.25 day to 1 day. The polycaprolactone was cooled between 100° C. and 120° C. After two hours from temperature decrease, 850 g (5.90 moles) of L-Lactide was added to the reaction vessel. The mixture was allowed to stir and mix for about 1 to 3 hours to allow the L-Lactide to fully melt and the components to disperse. Then temperature was increased between 121° C. and 180° C. and the system was heated for 3 days to 5 days. The resultant triblock PLLA-PCL-PLLA was found to have an IV of 3.3±0.1 dL/g.

Example 13

Preparation and characterization of a triaxial PLLA homopolymer with a theoretical Mn of ~303,000 Da. This is an analogue to the blend component "Polymer B" and is referenced as "Polymer B" analogue.

In a reactor with a mixing stirrer, 1000 g (6.94 moles) of L-Lactide and 0.47 g (0.00348 moles) of trimethylolpropane were combined. The mixture was allowed to stir and mix for about 1 to 3 hours between 110° C. and 130° C. to allow the L-Lactide to fully melt and the components to disperse. Then 347 µL of a 0.2M tin(II)2-ethylhexanoate in toluene solution was added. The temperature was increased between 131° C. and 180° C. and the system was heated for 3 days to 5 days. The resultant triaxial PLLA was found to have an IV of 3.5±0.0 dL/g.

Example 14

Preparation and characterization of a statistically anticipated 66/34 weight % PLLA-PCL-PLLA triblock copolymer/triaxial PLLA homopolymer melt blend with a theoretical overall blend Mn of ~255,000 Da, a PLLA-PCL-PLLA triblock copolymer Mn of ~238,000 Da (with PCL block Mn of ~36,000 Da), and a PLLA homopolymer Mn of ~303,000 Da.

The extruder set up and temperature profile was selected based on recommendations set forth in the Corbion Processing Guide (available at www.corbion.com/media/494327/pcg-sheet-and-film-extrusion.pdf), which is incorporated herein by reference, with the exception that the temperature of the feed zone was set between 15° C. and 40° C., rather than the temperature recommended in the Corbion Processing Guide. In a glass jar, 662.48 g of the PLLA-PCL-PLLA triblock copolymer made in Example 12 and 337.25 g of the triaxial PLLA homopolymer made in Example 13 were combined. The jar was sealed and shaken by hand then placed on a roller for 10 minutes. The jar was then shaken by hand again and placed on the roller for 10 minutes. After mixing in the jar, the resin was dried down to less than the critical moisture level of 125 ppm. The contents of the jar were emptied into an extruder hopper. A single screw extruder with L/D ratio between 24 and 32 was used. The melt zone was set between 180° C. and 210° C. The mixing and conveying was set to 190° C. and 210° C. The die head temperature was set between 190° C. and 210° C. The resultant melt blend of PLLA-PCL-PLLA and PLLA was found to have an IV of 2.3±dL/g. One of ordinary skill in the art would appreciate that by changing the conditions or settings of the extrusion process, certain characteristics of the resultant melt blend can be altered.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for obtaining a bioabsorbable polymer blend comprising at least two bioabsorbable polymer components, comprising:
   controlling relative molecular weights of the at least two bioabsorbable polymer components and one or more ratios of the at least two bioabsorbable polymer components by selecting a plurality of reactants, the reactants comprising:
      a first initiator;
      a second initiator, wherein a first value associated with the second initiator is selected based at least in part on a first value associated with the first initiator; and
      a first monomer; and
   polymerizing the first monomer based at least in part on the first initiator and the second initiator in connection with obtaining the bioabsorbable polymer blend,
   wherein one of the first initiator and the second initiator is a small molecule initiator and the other of the first initiator and the second initiator is a macroinitiator.

2. The method of claim 1, wherein the one or more ratios of the at least two bioabsorbable polymer components are based at least in part on one or both of a weight ratio and a molar ratio.

3. The method of claim 1, wherein one or more of:
   (i) a composition of one or more of the at least two bioabsorbable polymer components,
   (ii) a molecular weight of one or more of the at least two bioabsorbable polymer components,
   (iii) a weight of at least one of the at least two bioabsorbable polymer components relative to a weight of at least one other of the at least two polymer components, and
   (iv) a molecular weight of at least one of the at least two bioabsorbable polymer components relative to a molecular weight of at least one other of the at least two bioabsorbable polymer components,
   is controlled.

4. The method of claim 1, wherein the first value associated with the second initiator is an amount of the second initiator, and the first value associated with the first initiator is an amount of the first initiator.

5. The method of claim 4, wherein the amount of the first initiator and the amount of the second initiator correspond to a mass or a number of moles.

6. The method of claim 1, wherein at least one of the first initiator and second initiator comprises at least one reactive site capable of functioning as an initiator for polymerization.

7. The method of claim 1, wherein the first value associated with the second initiator is a total number of reactive sites of the second initiator, and the first value associated with the first initiator is a total number of reactive sites of the first initiator.

8. The method of claim 7, wherein the total number of reactive sites of the second initiator is greater than the total number of reactive sites of the first initiator.

9. The method of claim 7, wherein the total number of reactive sites of the first initiator is greater than the total number of reactive sites of the second initiator.

10. The method of claim 6, wherein at least a subset of the at least one reactive site is a hydroxyl group.

11. The method of claim 10, wherein at least one of the first initiator and second initiator comprises an alcohol, diol, triol, tetraol, or pentaol.

12. The method of claim 11, wherein at least one of the first initiator and second initiator comprises 1-decanol, 1-dodecanol, lactic acid, water, ethylene glycol, poly(ethylene glycol), 1,3-propanediol, 1,6-hexanediol, methane triol, 1,2,3-propanetriol, 2-(hydroxymethyl)propane-1,3diol, 2-ethyl-2-(hydroxymethyl)propane-1,3-diol, tris(2-hydroxyethyl)amine), methanetetraol or 2,2-bis(hydroxymethyl)propane-1,3-diol).

13. The method of claim 1, wherein at least one of the first initiator and the second initiator is a macroinitiator that is produced based at least in part by polymerizing a second monomer using at least a third initiator.

14. The method of claim 13, wherein two or more of the first initiator, second initiator and third initiator are the same.

15. The method of claim 13, where in the first monomer is the same as the second monomer.

16. The method of claim 1, wherein the macroinitiator comprises a polylactide, a polycaprolactone, a polyglycolide; a poly(dioxanone); a poly trimethylene carbonate; a poly(hydroxybutyrate); a poly(anhydrides); an aliphatic polycarbonate; a poly(orthoesters); a poly(amino acid); a poly(ethylene oxide); a poly (ethylene glycol); a polyphosphazene, a polyvinyl alcohol, or a copolymer thereof.

17. The method of claim 1, wherein the macroinitiator comprises at least one reactive site capable of functioning as an initiator for polymerization.

18. The method of claim 6, wherein at least one of the first and second initiator comprises at least one reactive site that is not an initiation site, and wherein at least a subset of the at least one reactive site can be converted into an initiation site.

19. The method of claim 18, wherein one or more of the reactive sites that is not an initiation site can be converted into an initiation site in the event of a chemical reaction.

20. The method of claim 1, wherein the macroinitiator has a polydispersity index of less than about 2.

21. The method of claim 1, wherein the second initiator is not water.

22. The method of claim 1, wherein the first initiator is not water.

23. The method of claim 1, wherein the selecting the plurality of reactants comprises combining the first initiator and the second initiator according to a predetermined order.

24. The method of claim 2, wherein an amount of the first monomer is selected based at least in part on one or more of:
(i) the first value associated with the first initiator,
(ii) a second value associated with the first initiator,
(iii) a third value associated with the first initiator,
(iv) a fourth value associated with the first initiator,
(v) the first value associated with the second initiator,
(vi) a second value associated with the second initiator,
(vii) a third value associated with the second initiator,
(viii) a fourth value associated with the second initiator, and
(ix) a fifth value based at least in part on
(a) the first value associated with the first initiator and the first value associated with the second initiator or
(b) the second value associated with the first initiator and the second value associated with the second initiator or
(c) the third value associated with the first initiator and the third value associated with the second initiator or
(d) the fourth value associated with the first initiator and the fourth value associated with the second initiator.

25. A method for obtaining a polymer blend comprising at least two bioabsorbable polymer components comprising:
selecting a plurality of reactants, the plurality of reactants comprising:
a first initiator comprising a macroinitiator;
a second initiator comprising a small molecule initiator; and
a monomer; and
polymerizing the monomer based at least in part on the first initiator and the second initiator in connection with obtaining the bioabsorbable polymer blend.

26. A bioabsorbable polymer blend prepared according to the method of claim 1.

27. A medical device or product comprising the bioabsorbable polymer blend of claim 26.

28. The method of claim 1, wherein a second value associated with the second initiator is selected based at least in part on a second value associated with the first initiator.

* * * * *